(12) United States Patent
Cook

(10) Patent No.: US 12,078,279 B2
(45) Date of Patent: Sep. 3, 2024

(54) MOBILE ROBOT

(71) Applicant: The Boeing Company, Chicago, IL (US)

(72) Inventor: Rebecca Leigh Cook, Charleston, SC (US)

(73) Assignee: The Boeing Company, Chicago, IL (US)

( * ) Notice: Subject to any disclaimer, the term of this patent is extended or adjusted under 35 U.S.C. 154(b) by 637 days.

(21) Appl. No.: 17/204,271

(22) Filed: Mar. 17, 2021

(65) Prior Publication Data

US 2021/0301967 A1 Sep. 30, 2021

Related U.S. Application Data

(60) Provisional application No. 62/994,757, filed on Mar. 25, 2020.

(51) Int. Cl.
| | | |
|---|---|---|
| *F16L 55/34* | (2006.01) | |
| *B25J 5/00* | (2006.01) | |
| *B25J 19/02* | (2006.01) | |
| *F16L 55/44* | (2006.01) | |

(52) U.S. Cl.
CPC ............. *F16L 55/34* (2013.01); *B25J 5/00* (2013.01); *B25J 19/02* (2013.01); *F16L 55/44* (2013.01)

(58) Field of Classification Search
CPC .... F16L 55/34; F16L 55/44; B25J 5/00; B25J 19/02
USPC ...................................... 318/568.12
See application file for complete search history.

(56) References Cited

FOREIGN PATENT DOCUMENTS

| | | | | |
|---|---|---|---|---|
| CN | 105257950 A | * | 1/2016 | |
| CN | 106439387 A | * | 2/2017 | |
| JP | 2014188607 | * | 10/2014 | |
| KR | 101255674 B1 | * | 4/2013 | |

* cited by examiner

*Primary Examiner* — Jorge L Carrasquillo
(74) *Attorney, Agent, or Firm* — Jordan IP Law, LLC

(57) ABSTRACT

A robot includes a body having first and second segments configured to move relative to each other. Each segment has at least two legs. The legs extend non-parallel to the body and are configured to extend outwardly and retract inwardly relative to the body to enable the body to move within an operating environment.

24 Claims, 14 Drawing Sheets

MOBILE ROBOT

CROSS-REFERENCE TO RELATED APPLICATION

This Application claims priority to and the benefit of U.S. Provisional Patent Application Ser. No. 62/994,757, filed on Mar. 25, 2020 and entitled "MOBILE ROBOT FOR USE WITHIN CONFINED ENCLOSURES", which is incorporated herein by reference in its entirety.

BACKGROUND

Mobile robots are often used for performing various tasks, often in areas that are inaccessible and/or dangerous to human operators. Methods of locomotion of mobile robots that have been explored have several compromises that limit effectivity. For example, some known mobile robots use wheels or tracks to move. However, the operating environment often contains obstacles, debris, dirt, water, other liquids, irregular surfaces, and/or other encumbrances that interfere with the operation of the wheels or tracks and thereby reduce the effectiveness of wheeled/tracked mobile robots. Moreover, the operation of wheeled/tracked robots, as well as other known mobile robots (e.g., spider-type robots, etc.), relies on gravity (e.g., to provide traction, etc.) and is therefore limited to generally horizontal orientations. Accordingly, many known mobile robots are not capable of operating on walls or ceilings nor environments that include relatively highly-sloped and/or vertical paths. Some known mobile robots include suction cups that grip surfaces, however suction cups require a relatively clean and smooth surface with which to adhere. As the surfaces of many real-world operating environments include debris, dirt, water, other liquids, textures, irregular features, and/or the like, mobile robots that rely on suction cups may have limited practical use in real world applications. Another example of a known mobile robot is a snake-type device. However, snake-type devices are relatively long and require more space operate than desired.

In another example, the support capacity of some known mobile robots is insufficient to accommodate the reaction force of an end effector or support an end effector with a useful payload (e.g., many wheeled/tracked mobile robots cannot support useful payloads without tipping over, the relatively long length and/or lack of stiffness of snake-type devices limits the payload that can be supported thereby, etc.).

SUMMARY

In one aspect, a robot includes a body having first and second segments configured to move relative to each other. Each segment has at least two legs. The legs extend non-parallel to the body and are configured to extend outwardly and retract inwardly relative to the body to enable the body to move within an operating environment.

In another aspect, a robot includes an end effector and a body holding the end effector. The body extends a length along a longitudinal body axis. The body includes first and second segments configured to move relative to each other along the longitudinal body axis such that the length of the body is configured to extend outwardly and retract inwardly along the longitudinal body axis. Each segment of the body includes at least two legs. The legs extend lengths along corresponding longitudinal leg axes that extend non-parallel to the longitudinal body axis. The legs are configured to extend outwardly and retract inwardly relative to the body along the longitudinal leg axes.

In another aspect, a robot includes a telescoping body extending a length along a longitudinal axis. The body includes first and second segments configured to telescope inwardly and outwardly relative to each other along the longitudinal axis such that the length of the body is configured to expand and contract along the longitudinal axis. The first segment of the body includes at least two telescoping legs. The second segment of the body includes at least two telescoping legs. The telescoping legs are configured to telescope along lengths thereof such that the telescoping legs are configured to be extended outward relative to the body into physical contact with a surface of an operating environment of the robot.

In another aspect, a method of operating a robot includes activating the robot to move within an operating environment by selectively expanding and contracting the length of the body of the robot and selectively extending and retracting different legs into and from, respectively, a surface of the operating environment.

DETAILED DESCRIPTION

Figure 1:
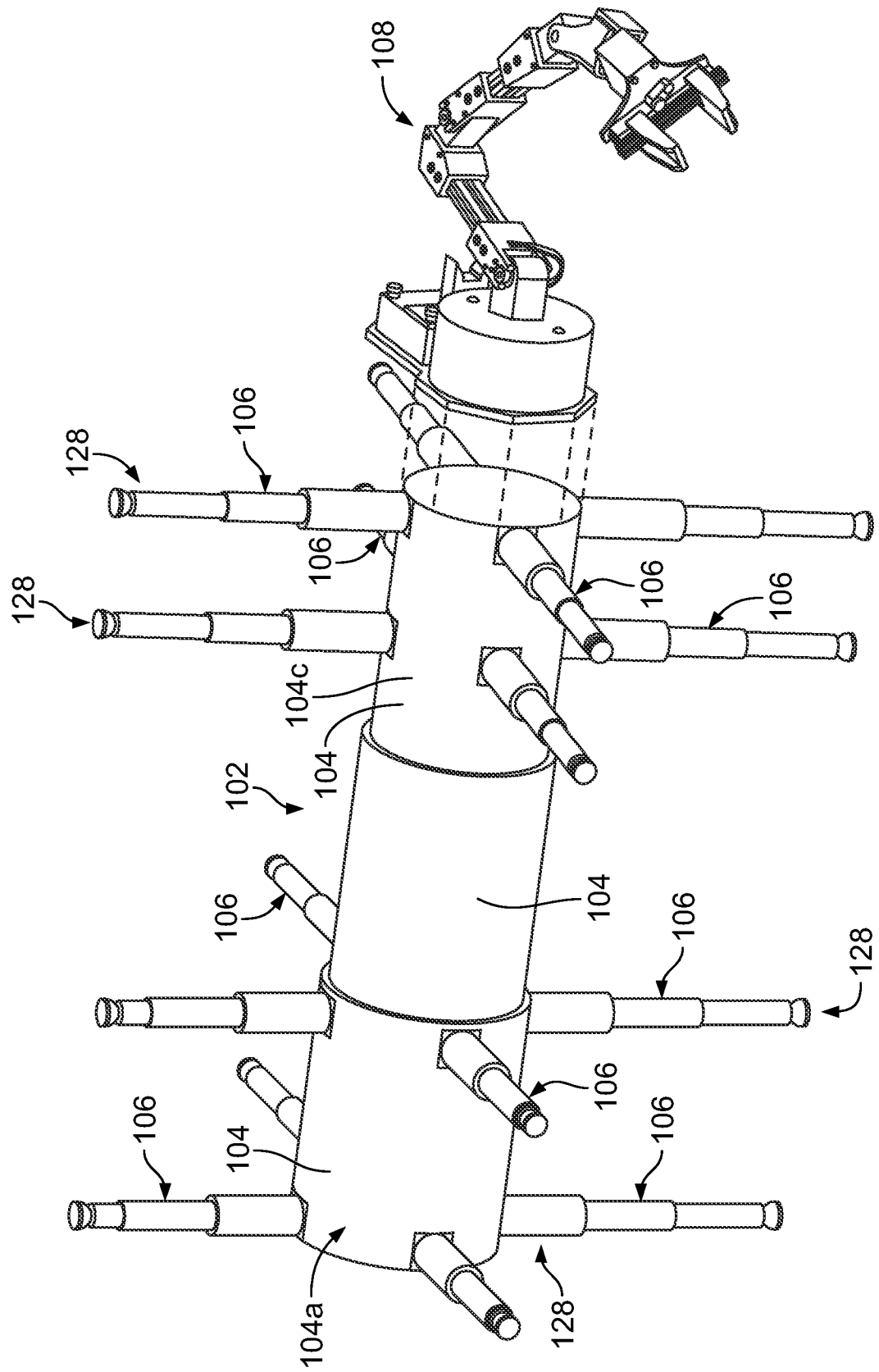
FIG. 1 is a perspective view illustrating a mobile robot according to an implementation.

The foregoing summary, as well as the following detailed description of certain embodiments and implementations will be better understood when read in conjunction with the appended drawings. As used herein, an element or step recited in the singular and preceded by the word "a" or "an" should be understood as not necessarily excluding the plural of the elements or steps. Further, references to "one embodiment" or "one implementation" are not intended to be interpreted as excluding the existence of additional embodiments or implementations that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments and implementations of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Certain implementations of the present disclosure provide a robot that includes a body having first and second segments configured to move relative to each other. Each segment has at least two legs. The legs extend non-parallel to the body and are configured to extend outwardly and retract inwardly relative to the body to enable the body to move within an operating environment.

Certain implementations of the present disclosure provide a method of operating a robot that includes activating the robot to move within an operating environment by selectively expanding and contracting the length of the body of the robot and selectively extending and retracting different legs into and from, respectively, a surface of the operating environment.

The mobile robot implementations disclosed herein have a practical use in a wide range of real world applications. The mobile robot implementations disclosed herein provide advantages over known mobile robots (e.g., the mobile robot implementations disclosed herein provide advantages over wheeled/tracked robots, spider-type robots, snake-type devices, robots that utilize suction cups, etc.).

For example, certain implementations of the present disclosure provide a mobile robot that is capable of moving within an operating environment despite the presence of obstacles, debris, dirt, water, other liquids, irregular surfaces, and/or other encumbrances along the path of the mobile robot. Moreover, certain implementations of the present disclosure provide a mobile robot that is capable of operating in a plurality of different orientations (e.g., generally vertical orientations, generally horizontal orientations, orientations that are between vertical and horizontal, etc.). For example, certain implementations of the present disclosure provide a mobile robot that is capable of operating not only in a horizontal orientation but also in a generally vertical orientation and/or orientations between vertical and horizontal (e.g., sloped paths, angled paths, hills, etc.). Accordingly, certain implementations of the present disclosure provide a mobile robot that is capable of operating on walls and ceilings and/or capable of operating within operating environments that include relatively highly-sloped and/or vertical paths.

In another example, certain implementations of the present disclosure provide a mobile robot that is not limited to operating within operating environments having relatively clean and smooth surfaces, but rather is capable of operating within operating environments having surfaces that include debris, dirt, water, other liquids, textures, irregular features, and/or the like. Moreover, certain implementations of the present disclosure provide a mobile robot that is shorter and less cumbersome to operate as compared to at least some known mobile robots.

In yet another example, certain implementations of the disclosure provide a mobile robot that has a greater stability and/or support capability as compared to at least some known mobile robots. For example, certain implementations of the present disclosure provide a mobile robot having sufficient stability to hold an end effector (e.g., a drill, an inspection tool, a cutter, an arm, a claw, another tool, a camera, etc.) with support sufficient to enable the end effector to perform a corresponding task with sufficient accuracy. Moreover, certain implementations of the present disclosure provide a mobile robot having a support capacity that is sufficient to accommodate the reaction force of an end effector during normal operation of the end effector. In another example, certain implementations of the present disclosure provide a mobile robot having sufficient support capacity (e.g. sufficient holding force, sufficient tip resistance, etc.) to support an end effector with a useful payload.

With references now to the figures, a perspective view of a mobile robot 100 is provided in FIG. 1. The mobile robots described and/or illustrated herein are configured to be operated within any operating environment, for example confined enclosures (i.e., confined spaces, confined areas, etc.), non-confined enclosures (i.e., non-confined spaces, non-confined areas, etc.), open spaces (i.e., open areas, etc.), etc. Examples of confined enclosures accessed by the mobile robots described and/or illustrated herein include, but are not limited to, pipes, tubes, channels, tunnels, caves and other natural formations, shafts, chambers, wet environments, explosive environments, fuel tanks, marine vessel structures (e.g., hulls, pipes, fuel tanks, etc.), aircraft structures (fuel tanks, wings, fuselages, etc.), and/or the like.

The robot 100 includes a telescoping body 102 having two or more segments 104. The segments 104 are configured to telescope inwardly and outwardly relative to each other along the length of the body 102 such that the length of the body 102 is configured to selectively expand and contract. At least some segments 104 of the body 102 include telescoping legs 106 that are configured to telescope along the lengths thereof such that the legs 106 can be selectively extended outwardly and retracted inwardly relative to the body 102. For example, the legs 106 can be extended outwardly into physical contact with a surface of the operating environment (e.g., to provide stiction, friction, traction, and/or the like for moving the body 102 within the operating environment and/or for holding the body 102 in position at a location within the operating environment; to secure, support, stabilize, hold, and/or the like the body 102 within the operating environment; to grip the surface of the operating environment; etc.).

As will be described in more detail below with respect to the robot 200 shown in FIGS. 2-7, the robot 100 is configured to move within the operating environment (e.g., traverse a path within the operating environment, navigate to a destination within the operating environment, etc.) by selectively expanding and contracting the length of the body 102 and selectively extending and retracting different legs 106 into and from, respectively, the surface of the operating environment. In some implementations, the body 102 of the mobile robot 100 is configured to hold an end effector 108 for performing various tasks within the operating environment. Each of the segments 104 of the body 102 may be referred to herein as a "first segment", a "second segment", a "first body segment", and/or a "second body segment".

Referring now to FIGS. 2-7, the robot 200 includes a body 202 that extends a length along a longitudinal axis 210 from an end portion 212 to an opposite end portion 214. The body 202 includes at least two segments 204. In the exemplary implementation shown in FIGS. 2-7, the body 202 includes three segments 204a, 204b, and 204c, but in other implementations the body 202 includes only two segments 204 or includes four or more segments 204. The segments 204a and 204c include the end portions 212 and 214, respectively, of the body 102. The longitudinal axis 210 may be referred to herein as a "longitudinal body axis". Each of the segments 204a, 204b, and 204c may be referred to herein as a "first segment", a "second segment", a "first body segment", and/or a "second body segment". The example shown in FIG. 2 differs from the example of FIG. 1 in that each of the segments 204a and 204c of the body 202 of the robot shown in FIG. 2 includes a single set 228 of four legs 206, whereas FIG. 1 illustrates one other example wherein the segments 104a and 104c of the body 102 each include two sets 128 of legs 106, with each set 128 having four of the legs 106.

Figure 2:
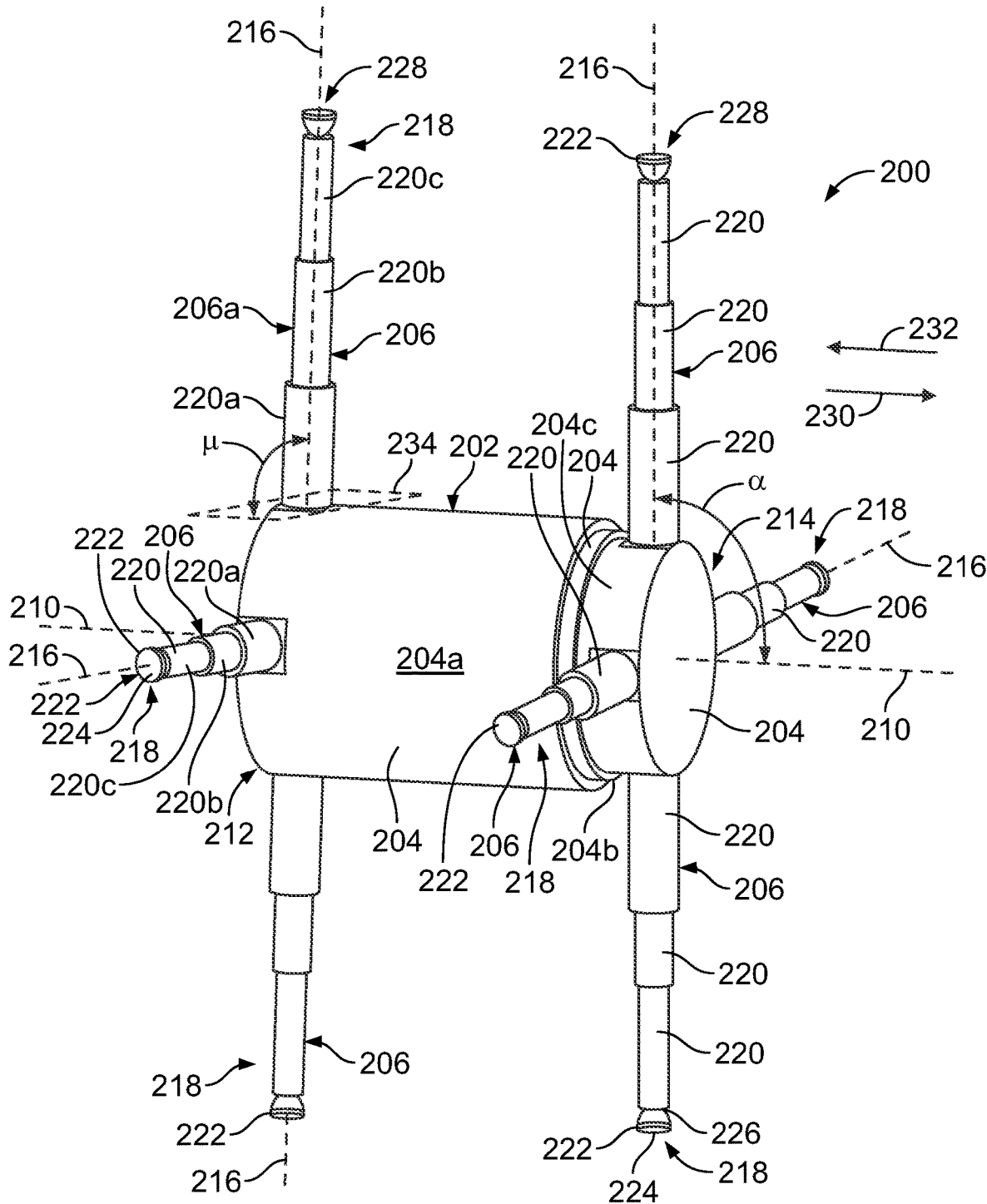
FIG. 2 is a perspective view illustrating a mobile robot according to another implementation.
Figure 3:
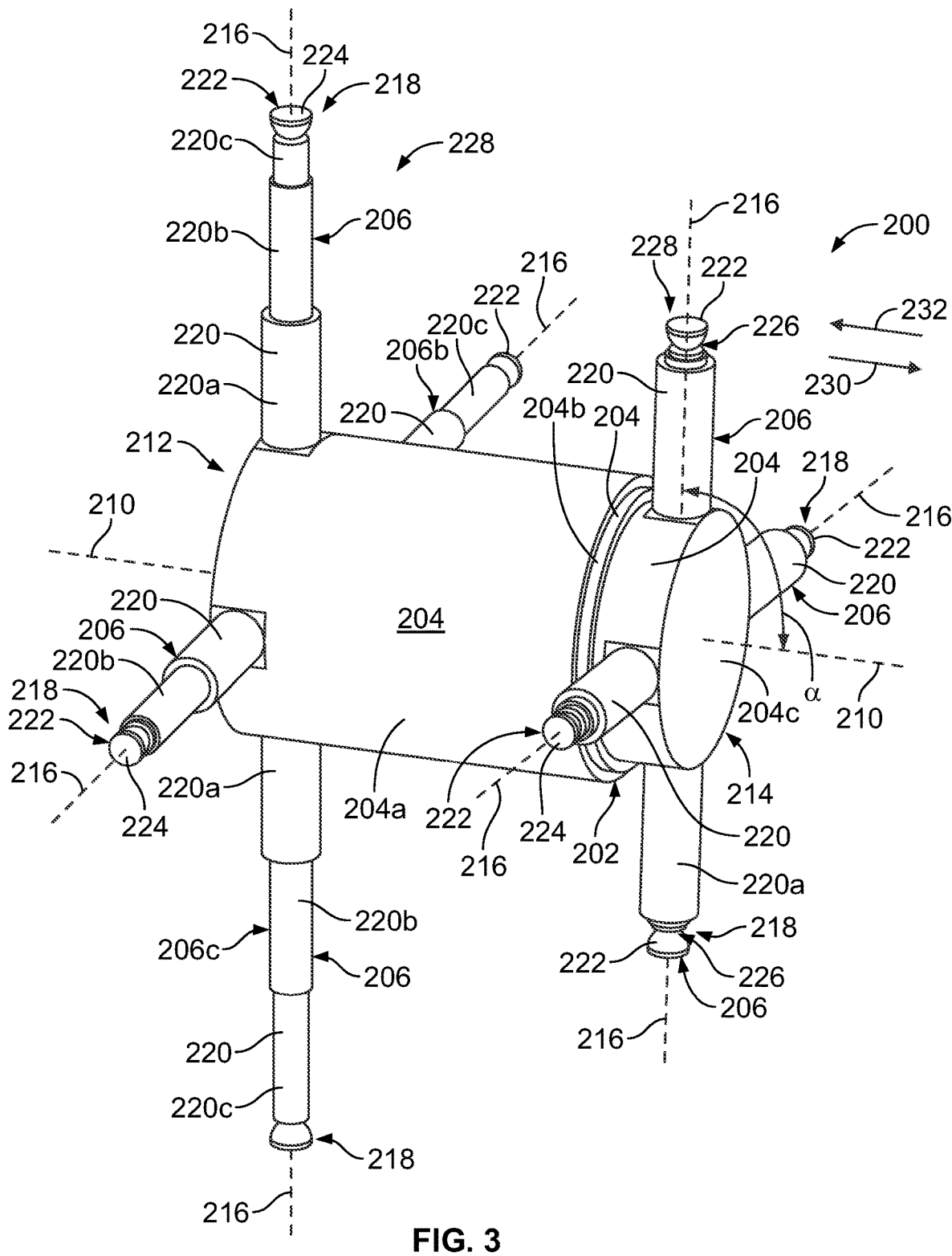
FIG. 3 is a perspective view of the mobile robot shown in FIG. 2 illustrating the mobile robot in a collapsed position with a first set of legs retracted according to an implementation.
Figure 7:
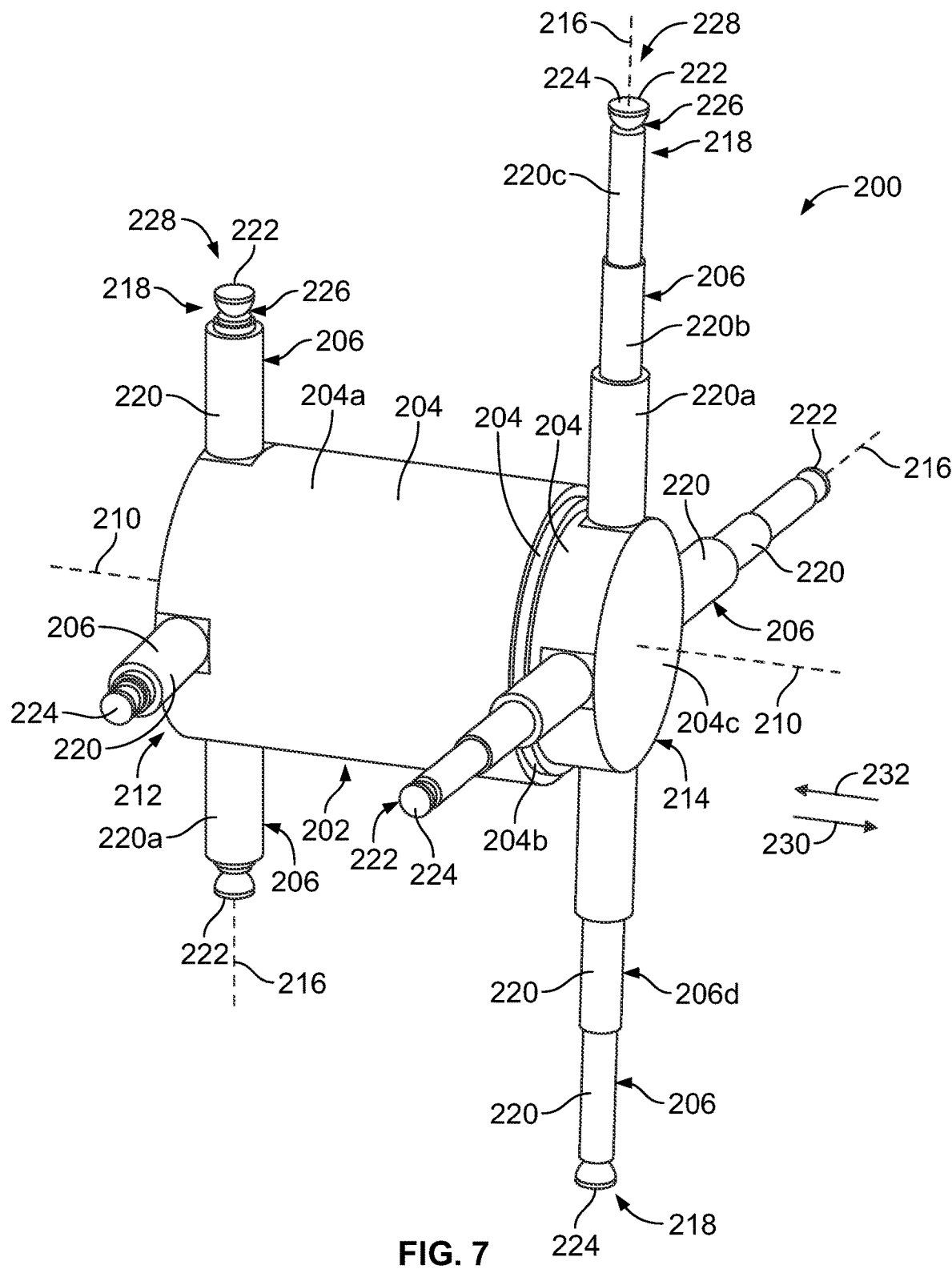
FIG. 7 is a perspective view of the mobile robot shown in FIGS. 2-6 illustrating the mobile robot in a collapsed position with the second set of legs retracted according to an implementation.

As is briefly described above with respect to the mobile robot 100 shown in FIG. 1, the segments 204a, 204b, and 204c of the body 202 of the mobile robot 200 are arranged with a telescoping structure such that the length of the body 202 is configured to selectively expand and contract along the longitudinal axis 210. For example, the size (e.g., diameter, etc.) of the segment 204b is smaller than the segment 204a such that the segment 204b can be retracted within the segment 204a along the longitudinal axis 210. Similarly, the size of the segment 204c is smaller than the size of the segment 204b such that the segment 204c can be retracted within the segment 204b along the longitudinal axis 210. Moreover, the segments 204a, 204b, and 204c are configured to move relative to each other along the longitudinal axis 210. Accordingly, movement of the segments 204a, 204b, and/or 204c toward each other along the longitudinal axis 210 retracts the segments 204b and 204c at least partially into the respective segments 204a and 204b, which retracts (e.g., shrinks, shortens, at least partially collapses, etc.) the length of the body 202 inwardly along the longitudinal axis 210. In other words, when the segments 204a, 204b, and/or 204c telescope inwardly relative to each other along the longitudinal axis 210, the length of the body 202 contracts (e.g., shrinks, shortens, at least partially collapses, etc.) along the longitudinal axis 210 FIGS. 2, 3, and 7 illustrate the length of the body 202 in a collapsed (i.e., retracted, contracted, etc.) position.

Figure 4:
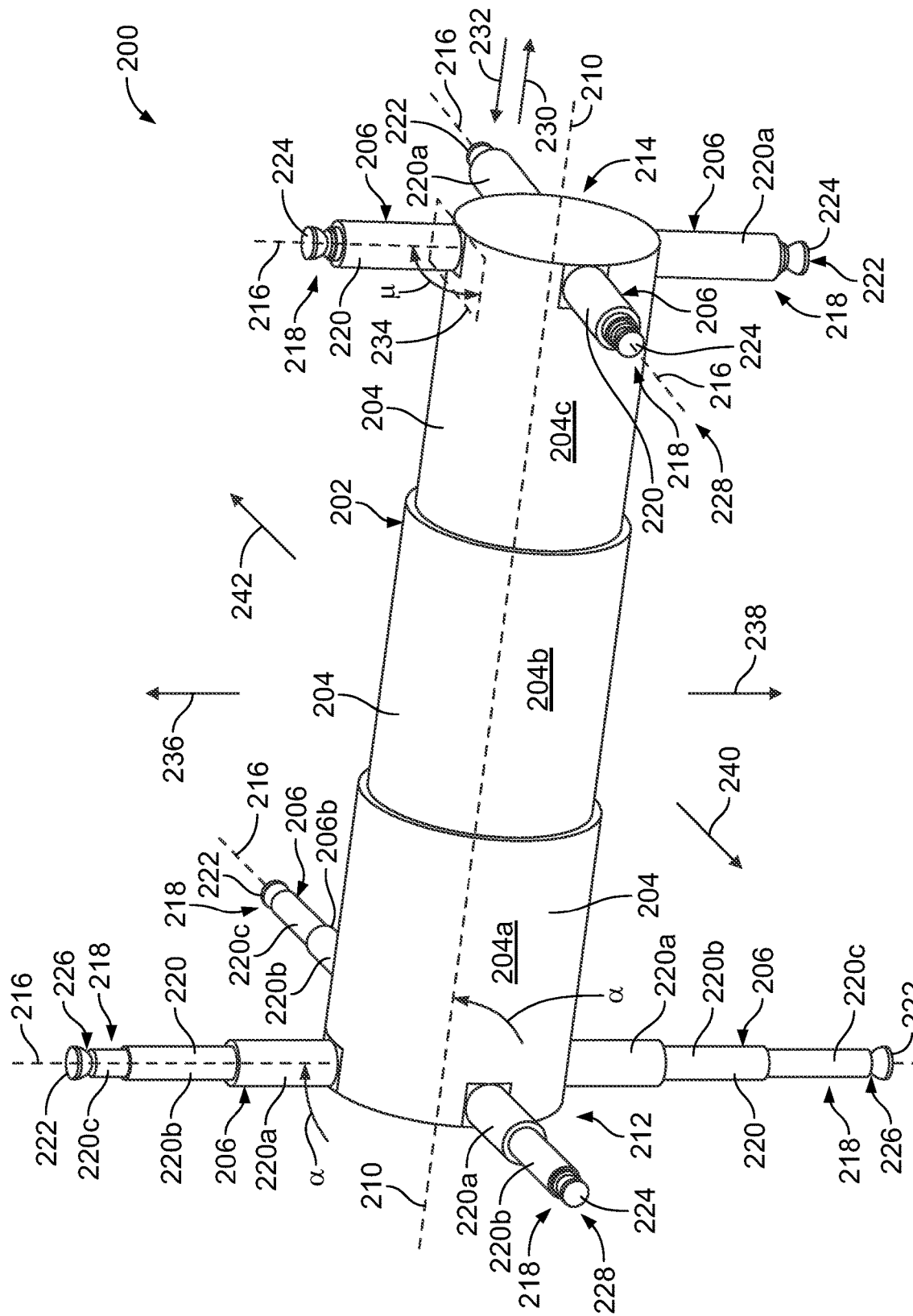
FIG. 4 is a perspective view of the mobile robot shown in FIGS. 2 and 3 illustrating the mobile robot in an expanded position with the first set of legs retracted according to an implementation.
Figure 5:
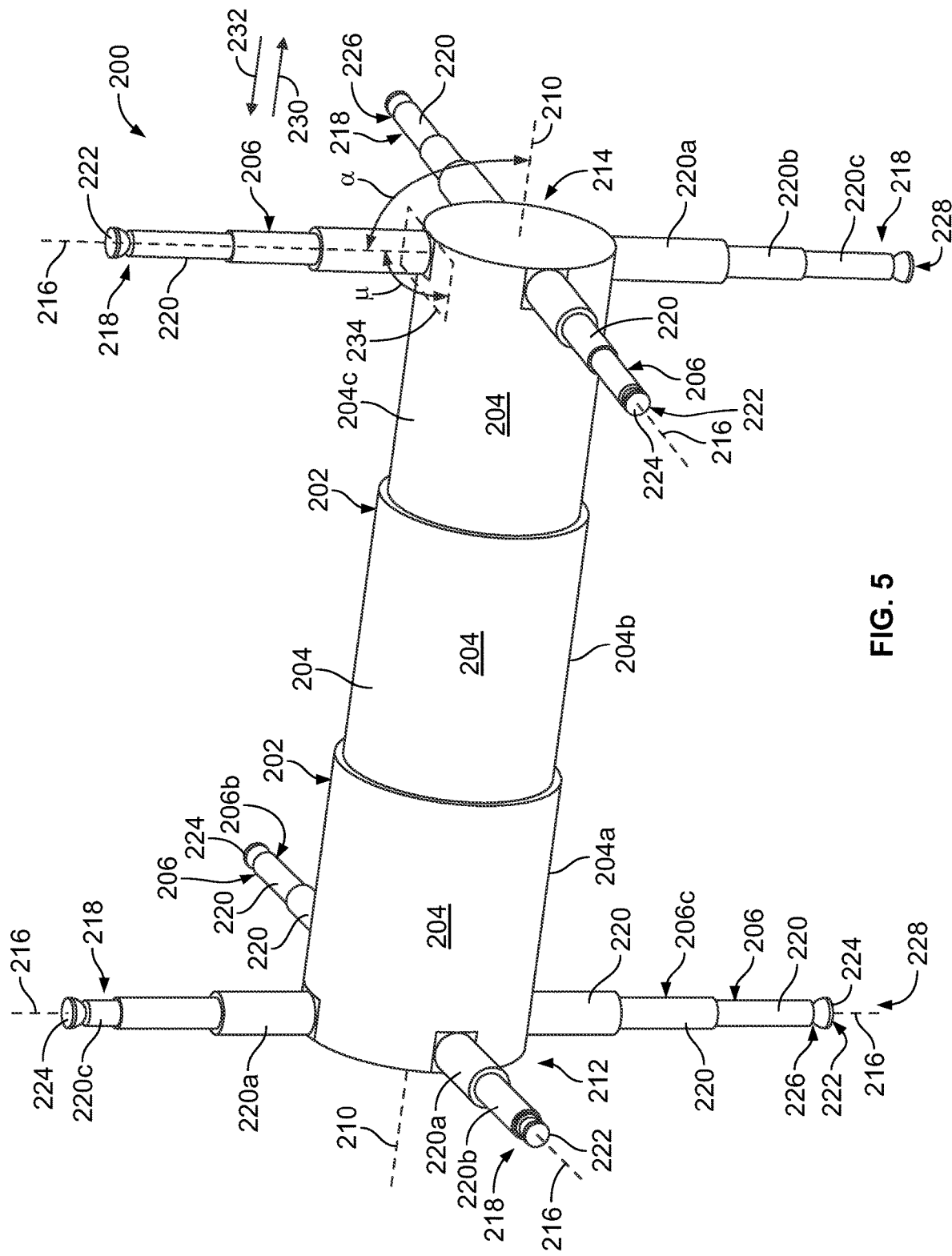
FIG. 5 is a perspective view of the mobile robot shown in FIGS. 2-4 illustrating the mobile robot in an expanded position with first and second sets of legs extended according to an implementation.
Figure 6:
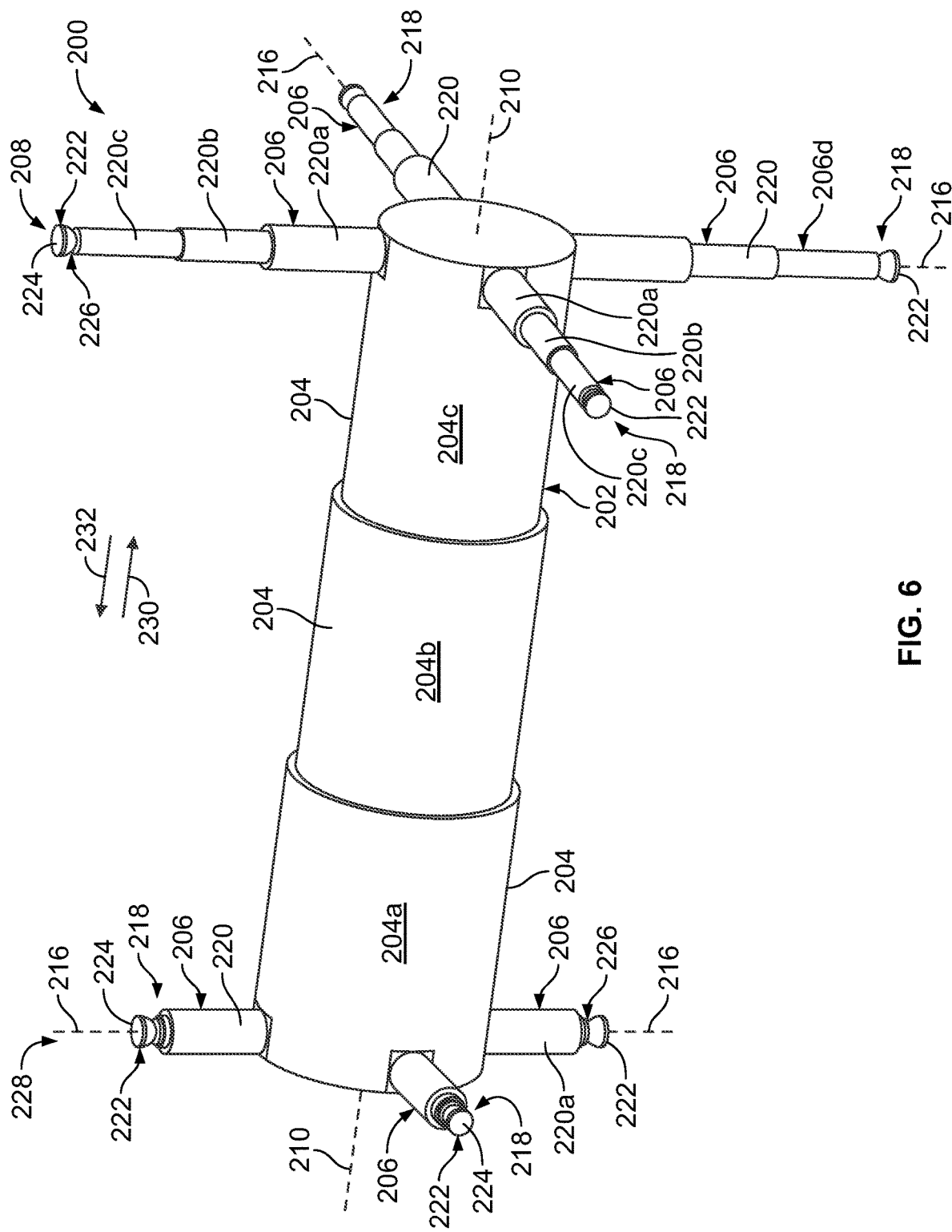
FIG. 6 is a perspective view of the mobile robot shown in FIGS. 2-5 illustrating the mobile robot in an expanded position with the second set of legs retracted according to an implementation.

Movement of the segments 204a, 204b, and/or 204c away from each other along the longitudinal axis 210 extends the segments 204b and 204c at least partially out of the respective segments 204a and 204b, which extends (e.g., lengthens, etc.) the length of the body 202 outwardly along the longitudinal axis 210. In other words, when the segments 204a, 204b, and 204c telescope outwardly relative to each other along the longitudinal axis 210, the length of the body 202 expands (e.g., lengthens, etc.) along the longitudinal axis 210. FIGS. 4-6 illustrate the length of the body 202 in an expanded (i.e., extended, etc.) position.

Movement of the segments 204 relative to each other along the longitudinal axis 210 is actuated using any suitable means that enables the mobile robot 200 to function as described and/or illustrated herein (e.g., enables the length of the body 202 to expand and contract along the longitudinal axis 210, enables the body 202 to move within the operating environment, etc.), such as, but not limited to, electrical motors, servos, solenoids, linear actuators, gears, mechanical joints, mechanical linkage, bearings, chains, pulleys, differentials, counterweights, hydraulic pumps, pneumatic pumps, mechanical systems, pneumatic systems, hydraulic systems, electrical systems, combinations thereof, and/or the like. Movement of the segments 204 relative to each other along the longitudinal axis 210 is powered using any suitable means that enables the mobile robot 200 to function as described and/or illustrated herein (e.g., enables the length of the body 202 to expand and contract along the longitudinal axis 210, enables the body 202 to move within the operating environment, etc.), such as, but not limited to, a battery system, a hard-wired electrical system, a pneumatic system, a mechanical system, a hydraulic system, combinations thereof, and/or the like.

In some implementations, one or more of the segments 204 of the body 202 is configured to rotate about the longitudinal axis 210. For example, one or more of the segments 204 of the body 202 is configured to independently rotate about the longitudinal axis 210. Rotation of a segment 204 about the longitudinal axis 210 enables the body 202 to reorient legs 206 (e.g., described below, etc.) of the segment 204, for example to establish a different footing of the segment 204 within the operating environment (e.g., to establish a footing that provides the body 202 with improved security, stability, support, holding force, grip, and/or the like, etc.). In some examples, the robot 200 may rotate as such to provide rolling motion.

In the exemplary implementation shown in FIGS. 2-7, the segments 204a and 204c are each configured to independently rotate about the longitudinal axis 210. For example, the segment 204a is configured to rotate about the longitudinal axis 210 while the segments 204b and/or 204c remain stationary about the longitudinal axis 210, and vice versa. However, the segments 204a and 204c are also configured to simultaneously rotate about the longitudinal axis 210 (e.g., at approximately the same rate, at different rates, etc.), for example while the segment 204b remains stationary about the longitudinal axis 210, etc. In other implementations, the segment 204b of the body 202 is configured to rotate about the longitudinal axis 210 in addition or alternative to the segments 204a and/or 204c.

Rotation of the segments 204 about the longitudinal axis 210 is actuated using any suitable means that enables the mobile robot 200 to function as described and/or illustrated herein (e.g., enables the body 202 to reorient legs 206 of one or more of the segments 204, enables the body 202 to establish a different footing of one or more segments 204 within the operating environment, etc.), such as, but not limited to, electrical motors, servos, solenoids, linear actuators, gears, mechanical joints, mechanical linkage, bearings, chains, pulleys, differentials, counterweights, hydraulic pumps, pneumatic pumps, mechanical systems, pneumatic systems, hydraulic systems, electrical systems, combinations thereof, and/or the like. Rotation of the segments 204 about the longitudinal axis 210 is powered using any suitable means that enables the mobile robot 200 to function as described and/or illustrated herein (e.g., enables the body 202 to reorient legs 206 of one or more of the segments 204, enables the body 202 to establish a different footing of one or more segments 204 within the operating environment, etc.), such as, but not limited to, such as, but not limited to, a battery system, a hard-wired electrical system, a pneumatic system, a mechanical system, a hydraulic system, combinations thereof, and/or the like.

Although shown as having cylindrical shapes, in other implementations one or more of the segments 204a, 204b, and/or 204c of the body 202 includes any other shape (e.g., a parallelepiped, a rectangular cross-sectional shape, another four-sided cross-sectional shape, a triangular cross-sectional shape, an oval cross-sectional shape, a cross-sectional shape having five or more sides, etc.) that enables the body 202 to function as described and/or illustrated herein (e.g., enables the body 202 to selectively expand and contract along the longitudinal axis 210, etc.).

At least some segments 204 of the body 202 include the legs 206 briefly mentioned above. Each leg 206 extends a length along a longitudinal axis 216. The length of each leg 206 extends radially outward from the corresponding segment 204 of the body 202 to a free end portion 218 of the leg 206. Each leg 206 includes at least two segments 220. In the exemplary implementation shown in FIGS. 2-7, each leg 206 includes three segments 220a, 220b, and 220c, but in other implementations one or more of the legs 206 includes only two segments 220 or includes four or more segments 220. The segments 220c include the end portions 218 of the legs 206. The longitudinal axes 216 may be referred to herein as "longitudinal leg axes", while each longitudinal axis 216 may be referred to herein as a "longitudinal leg axis".

As is briefly described above with respect to the mobile robot 100 shown in FIG. 1, the legs 206 are telescoping legs 206. Specifically, the segments 220 of each leg 206 are arranged with a telescoping structure such that the length of each leg 206 is configured to selectively expand and contract along the longitudinal axis 216. In other words, each leg 206 is configured to telescope along the length thereof such that the leg 206 can be selectively extended outwardly and retracted inwardly relative to the body 202 along the longitudinal axis 216. For example, the size (e.g., diameter, etc.) of the segment 220b is smaller than the segment 220a such that the segment 220b can be retracted within the segment 220a along the longitudinal axis 216. Similarly, the size of the segment 220c is smaller than the size of the segment 220b such that the segment 220c can be retracted within the segment 220b along the longitudinal axis 216. Moreover, the segments 220a, 220b, and 220c are configured to move relative to each other and the corresponding segment 204 of the body 202 along the longitudinal axis 216.

Accordingly, movement of the segments 220a, 220b, and/or 220c of a leg 206 toward each other and the body 202 along the longitudinal axis 216 retracts the segments 220b and 220c at least partially into the respective segments 220a and 220b, which retracts (e.g., shrinks, shortens, at least partially collapses, etc.) the length of the leg 206 inwardly along the longitudinal axis 216. In other words, when the segments 220a, 220b, and/or 220c of a leg 206 telescope inwardly relative to each other and the body 202 along the longitudinal axis 216, the leg 206 retracts inwardly relative to the body 202 along the longitudinal axis 216. FIGS. 3 and 4 illustrate the legs 206 of the body segment 204c in an exemplary implementation of a retracted position, while FIGS. 6 and 7 illustrate the legs 206 of the body segment 204a in the exemplary retracted position. Although the segments 220a of the legs 206 are shown herein as extending outwardly from the body 202 in the exemplary implementation of the retracted position, in other implementations the segment 220a of one or more of the legs 206 is at least partially retracted within the corresponding segment 204 of the body 202 when the leg 206 is in the retracted position.

Movement of the segments 220a, 220b, and/or 220c of a leg 206 away from each other and the body 202 along the longitudinal axis 216 extends the segments 220b and 220c at least partially out of the respective segments 220a and 220b, which extends (e.g., lengthens, etc.) the length of the leg 206 outwardly along the longitudinal axis 216. In other words, when the segments 220a, 220b, and 220c telescope outwardly relative to each other and the body 202 along the longitudinal axis 216, the leg 206 extends outwardly relative to the body 202 along the longitudinal axis 216. FIG. 2 illustrates a leg 206a of the body segment 204a in an exemplary implementation of an extended position. FIGS. 3-5 illustrate legs 206b and 206c of the body segment 204a in the exemplary extended position. FIGS. 6 and 7 illustrate a leg 206d of the body segment 204c in the exemplary extended position. In the exemplary implementation shown in FIGS. 2-7, each of the legs 206 has approximately the same length in the extended position thereof. In other implementations, one or more of the legs 206 may have an extended length that is different as compared to the extended length of one or more other legs 206.

As briefly described above, each leg 206 can be extended outwardly relative to the corresponding segment 204 of the body 202 such that the end portion 218 of the leg 206 is extended into physical contact with the surface of the operating environment, for example to: provide stiction, friction, traction, and/or the like for moving the body 202 and/or for holding the body 202 in position at a location within the operating environment; secure, support, stabilize, hold, and/or the like the body 202; grip a surface; etc. Each leg 206 can be retracted inwardly relative to the corresponding segment 204 of the body 202 to disengage the end portion 218 from the surface of the operating environment (e.g., to enable the body 202 to expand or contract along the longitudinal axis 210, to enable the corresponding segment 204 of the body 202 to rotate about the longitudinal axis 210 and thereby change the orientation of the legs 206 thereof, etc.).

The end portion 218 of one or more of the legs 206 optionally includes a foot 222 configured to engage in physical contact with the surface of the operating environment. For example, each foot 222 includes an engagement surface 224 at which the foot 222 engages in physical contact with the surface of the operating environment. Each foot 222 includes any geometry (e.g., size, shape, etc.) that enables the leg 206 to function as described and/or illustrated herein (e.g., to provide stiction, friction, traction, and/or the like for moving the body 202 and/or for holding the body 202 in position at a location within the operating environment; to secure, support, stabilize, hold, and/or the like the body 202; to grip a surface; etc.).

In the exemplary implementation shown in FIGS. 2-7, the engagement surface 224 of each foot 222 is an approximately smooth (e.g., planar, etc.) surface. In some other implementations, the engagement surface 224 of one or more feet 222 includes means that increase the ability of the foot 222 to grip the surface of the operating environment (e.g., means that increase stiction, friction, traction, etc.). For example, in some implementations the engagement surface 224 of one or more of the feet 222 includes a textured surface, a pointed surface (e.g., one or more points that dig into the surface of the operating environment, etc.), an adhesive surface, a suction cup, an elastomeric material, a plastic material, a rubberized material, and/or the like. Moreover, and for example, the engagement surface 224 of one or more of the feet 222 is defined at least partially by a wheel, roller, bearing, and/or the like in some implementations.

In some implementations, one or more of the feet 222 is compliant (e.g., includes one or more complaint structures, the engagement surface 224 is compliant, etc.) such that the foot 222 is configured to at least partially conform with (i.e., to) the surface of the operating environment. For example, the engagement surface 224 and/or another portion of one or more of the feet 222 may include a cushion, a resilient member, an elastomeric member, a pliable member, a shape memory material, and/or the like that is configured to conform to the surface of the operating environment. Moreover, and for example, in some implementations at least a portion of one or more of the feet 222 is configured to move (e.g., tilt, swivel, pivot, rotate, etc.) relative to the corresponding longitudinal axis 216 to provide the foot 222 with compliance that enables the foot 222 to at least partially conform with the surface of the operating environment (e.g., the conformity with the exemplary surface 902 shown in the example of FIG. 8, etc.). In the exemplary implementation shown in FIGS. 2-7, the feet 222 are mounted to the corresponding legs 206 at a ball joint 226 that enables the feet 222 to move (e.g., tilt, swivel, pivot, rotate, etc.) about the longitudinal axes 216 and thereby at least partially conform to the surface of the operating environment (i.e., the ball joint 226 defines a compliant structure that enables the feet 222 to at least partially conform to the surface of the operating environment). Examples of other compliant structures that enable a foot 222 to move relative to the corresponding longitudinal axis 216 and thereby at least partially conform to the surface of the operating environment include, but are not limited to, other types of joints (e.g., clevises, spherical rod ends, etc.), fingers, webbing, netting, springs, dampers, elastomeric structures, bearings, and/or the like.

Movement of the segments 220 of each leg 206 relative to each other and the body 202 to telescope the leg 206 inwardly and outwardly along the longitudinal axis 216 is actuated using any suitable means that enables the mobile robot 200 to function as described and/or illustrated herein (e.g., enables the leg 206 to extend outwardly relative to the corresponding segment 204 of the body 202 such that the end portion 218 of the leg 206 is extended into physical contact with the surface of the operating environment, enables the leg 206 to retract inwardly relative to the corresponding segment 204 of the body 202 to disengage the end portion 218 from the surface of the operating environment, etc.), such as, but not limited to, electrical motors, servos, solenoids, linear actuators, gears, mechanical joints, mechanical linkage, bearings, chains, pulleys, differentials, counterweights, hydraulic pumps, pneumatic pumps, mechanical systems, pneumatic systems, hydraulic systems, electrical systems, combinations thereof, and/or the like. Movement of the segments 220 relative to each other and/or the body 202 along the longitudinal axis 216 is powered using any suitable means that enables the mobile robot 200 to function as described and/or illustrated herein (e.g., enables the leg 206 to extend outwardly relative to the corresponding segment 204 of the body 202 such that the end portion 218 of the leg 206 is extended into physical contact with the surface of the operating environment, to retract the leg 206 inwardly relative to the corresponding segment 204 of the body 202 to disengage the end portion 218 from the surface of the operating environment, etc.), such as, but not limited to, a battery system, a hard-wired electrical system, a pneumatic system, a mechanical system, a hydraulic system, combinations thereof, and/or the like.

In some implementations, one or more of the legs 206 is independently extendable and retractable relative to the body 202 along the longitudinal axis 216 thereof as compared to one or more other legs 206. For example, in the exemplary implementation shown in FIGS. 2-7, each leg 206 is independently extendable and retractable relative to the body 202 along the longitudinal axis 216 thereof. In other implementations, and for example, at least some of the legs 206 of each body segment 204 (e.g., all of the legs 206 of the body segment 204, a set of the legs 206 of the body segment 204, etc.) are extendable and retractable relative to the body 202 as a group independently from the legs 206 of the other body segments 204. Optionally, one or more of the legs 206 includes any suitable means configured to detect when the end portion 218 of the leg 206 has engaged in sufficient physical contact with the surface of the operating environment and thereby halt extension of the leg 206 outwardly away from the body 202, such as, but not limited to, a force feedback sensor, a proximity sensor, a pneumatic bleed system, a hydraulic bleed system, and/or the like.

Although shown as having cylindrical shapes, in other implementations one or more of the segments 220a, 220b, and/or 220c of one or more of the legs 206 includes any other shape (e.g., a parallelepiped, a rectangular cross-sectional shape, another four-sided cross-sectional shape, a triangular cross-sectional shape, an oval cross-sectional shape, a cross-sectional shape having five or more sides, etc.) that enables the body 202 to function as described and/or illustrated herein (e.g., enables the leg 206 to telescope the leg 206 inwardly and outwardly along the longitudinal axis 216 relative to the body 202, etc.).

In the exemplary implementation shown in FIGS. 2-7, each of the segments 204a and 204c of the body 202 includes a single set 228 of four legs 206 such that the body 202 includes eight legs 206 overall. But, the body 202 may include any number of legs 206 overall, and each segment 204 of the body 202 may include any number of legs 206. Moreover, each segment 204 of the body 202 may include any number of sets 228 of legs 206, and each set 228 may include any number of legs 206 (e.g., one or more segments 204 includes two sets 228 of legs 206, one or more sets 228 of one or more segments 204 includes two legs 206, one or more sets 228 of one or more segments 204 includes three legs 206, etc.). FIG. 1 illustrates one other example wherein segments 104a and 104c of the body 102 each include two sets 128 of legs 106, with each set 128 having four of the legs 106.

Referring again to FIGS. 2-7, the legs 206 are not limited to the patterns shown herein. Rather, the legs 206 of each segment 204 may be arranged in any pattern (e.g., along the longitudinal axis 210, about the circumference of the body 202, etc.) that enables the mobile robot 200 to function as described and/or illustrated herein (e.g., enables the body 202 to move within the operating environment, enables the legs 206 to provide stiction, friction, traction, and/or the like for moving the body 202 within the operating environment and/or for holding the body 202 in position at a location within the operating environment, enables the legs 206 to secure, support, stabilize, hold, and/or the like the body 202 within the operating environment, enables the legs 206 to grip the surface of the operating environment, etc.). For example, in the exemplary implementation shown in FIGS. 2-7, the legs 206 of each set 228 are aligned along the longitudinal axis 210 of the body 202 (i.e., are aligned along the length of the body 202) with the other legs 206 of the same set 228. In other implementations, and for example, one or more of the legs 206 of one or more of the sets 228 is staggered along the longitudinal axis 210 (i.e., along the length of the body 202) from one or more other legs 206 of the same set 228. Moreover, in the exemplary implementation shown in FIGS. 2-7, the legs 206 of each set 228 are spaced approximately 900 apart from each other along the circumference of the body 202. In other implementations, and for example, the legs 206 of one or more sets 228 are spaced apart from adjacent legs 206 of the same set 228 by an angle of greater or lesser than approximately 900 (e.g., approximately 30°, approximately 45°, approximately 60°, approximately 75°, approximately 105°, approximately 120°, approximately 135°, approximately 150°, approximately 180°, etc.). In another example, the spacing between adjacent legs 206 is variable within the same set 228. For example, two adjacent legs 206 of a set 228 are spaced apart along the circumference of the body 202 by a first angle while two adjacent legs 206 in the same set 228 are spaced apart along the circumference of the body 202 by a second angle that is different than the first angle. In yet another example of a different pattern of the legs 206 about the circumference of the body 202, the legs 206 of a first set 228 are staggered about the circumference of the body 202 relative to the legs 206 of a second set 228 (e.g., the first and second sets 228 are on the same segment 204, the first and second sets 228 are on different segments 204, etc.).

Each leg 206 extends outwardly from the body 202 at a non-parallel angle relative to the length of the body 202. In other words, the longitudinal axes 216 of the legs 206 extend non-parallel to the longitudinal axis 210 of the body 202. In the exemplary implementation shown in FIGS. 2-7, the longitudinal axis 216 of each leg 206 extends at an angle α of approximately 900 relative to the longitudinal axis 210. In other implementations, the longitudinal axis 216 of one or more of the legs 206 extends at an angle α of less than approximately 900 (e.g., approximately 30°, approximately 45°, approximately 60°, approximately 75°, etc.) such that the leg 206 is swept along the longitudinal axis 210 in the direction of the arrow 230; and/or the longitudinal axis 216 of one or more of the legs 206 extends at an angle α of greater than approximately 900 (e.g., approximately 105°, approximately 120°, approximately 135°, approximately 150°, etc.) such that the leg 206 is swept along the longitudinal axis 210 in the direction of the arrow 232.

In the exemplary implementation shown in FIGS. 2-7, the longitudinal axis 216 of each leg 206 extends at an angle μ of approximately 900 relative to a corresponding tangent plane 234. In other implementations, the longitudinal axis 216 of one or more of the legs 206 extends at an angle μ of less than approximately 900 (e.g., approximately 30°, approximately 45°, approximately 60°, approximately 75°, etc.) such that the leg 206 is swept along the longitudinal axis 210 relative to the corresponding tangent plane 234; and/or the longitudinal axis 216 of one or more of the legs 206 extends at an angle μ of greater than approximately 900 (e.g., approximately 105°, approximately 120°, approximately 135°, approximately 150°, etc.) relative to the corresponding tangent plane 234.

As briefly described above with respect to the mobile robot 100 shown in FIG. 1, the mobile robot 200 is configured to move within the operating environment (e.g., traverse one or more paths within the operating environment; navigate to one or more destinations, locations, and/or the like within the operating environment; etc.) by selectively expanding and contracting the length of the body 202 and selectively extending and retracting different legs 206 into and from, respectively, the surface of the operating environment. Movement of the robot 200 within the operating environment is similar to the movement of an inch worm and to a human performing a spider climb technique.

Figure 8:
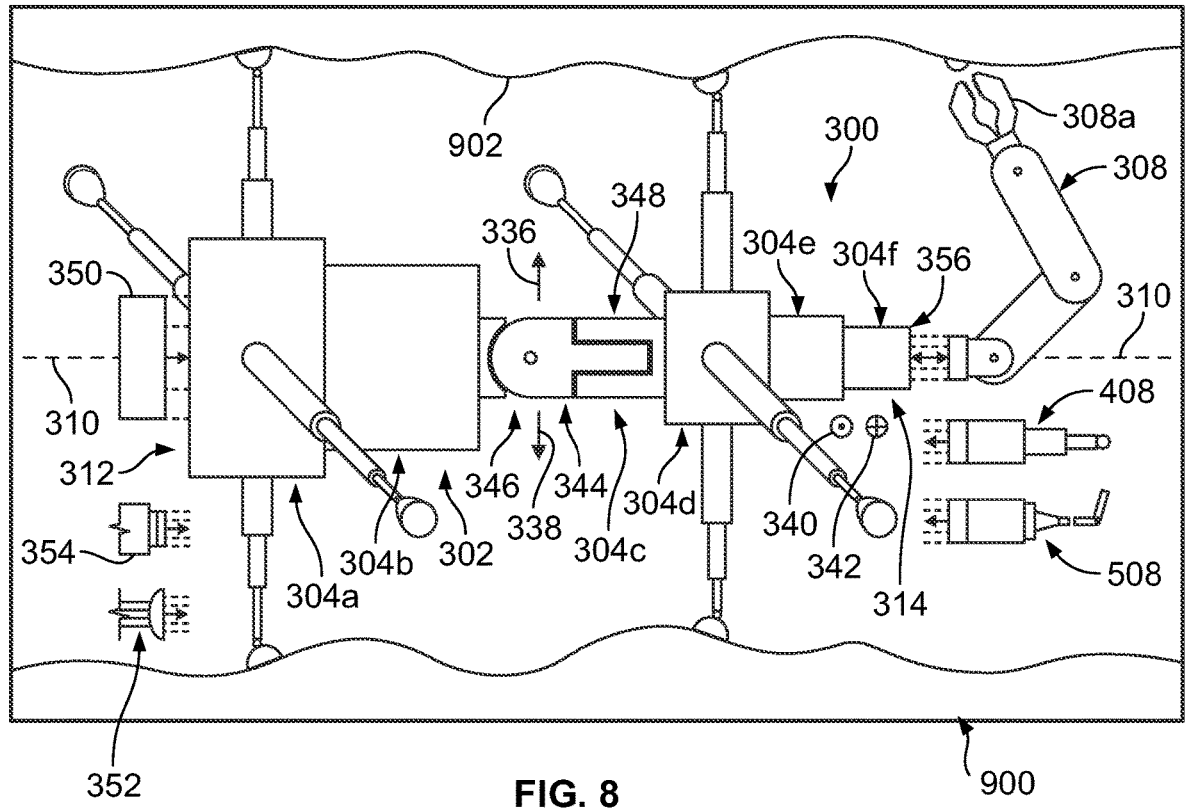
FIG. 8 is an elevational view of a mobile robot according to another implementation.
Figure 10:
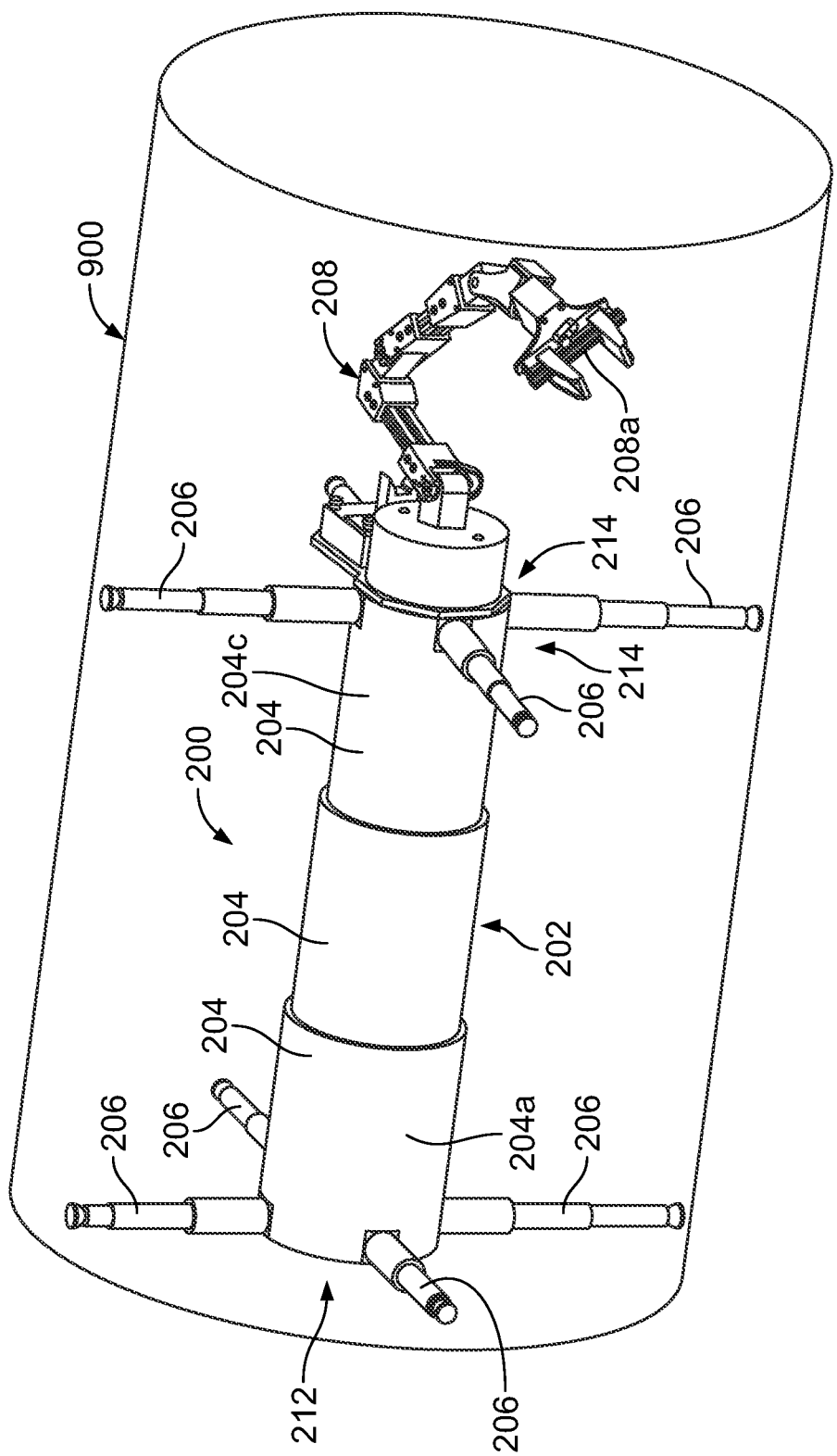
FIG. 10 is a perspective view illustrating the mobile robot shown in FIGS. 2-7 held in position within a generally horizontal segment of an operating environment according to an implementation.
Figure 11:
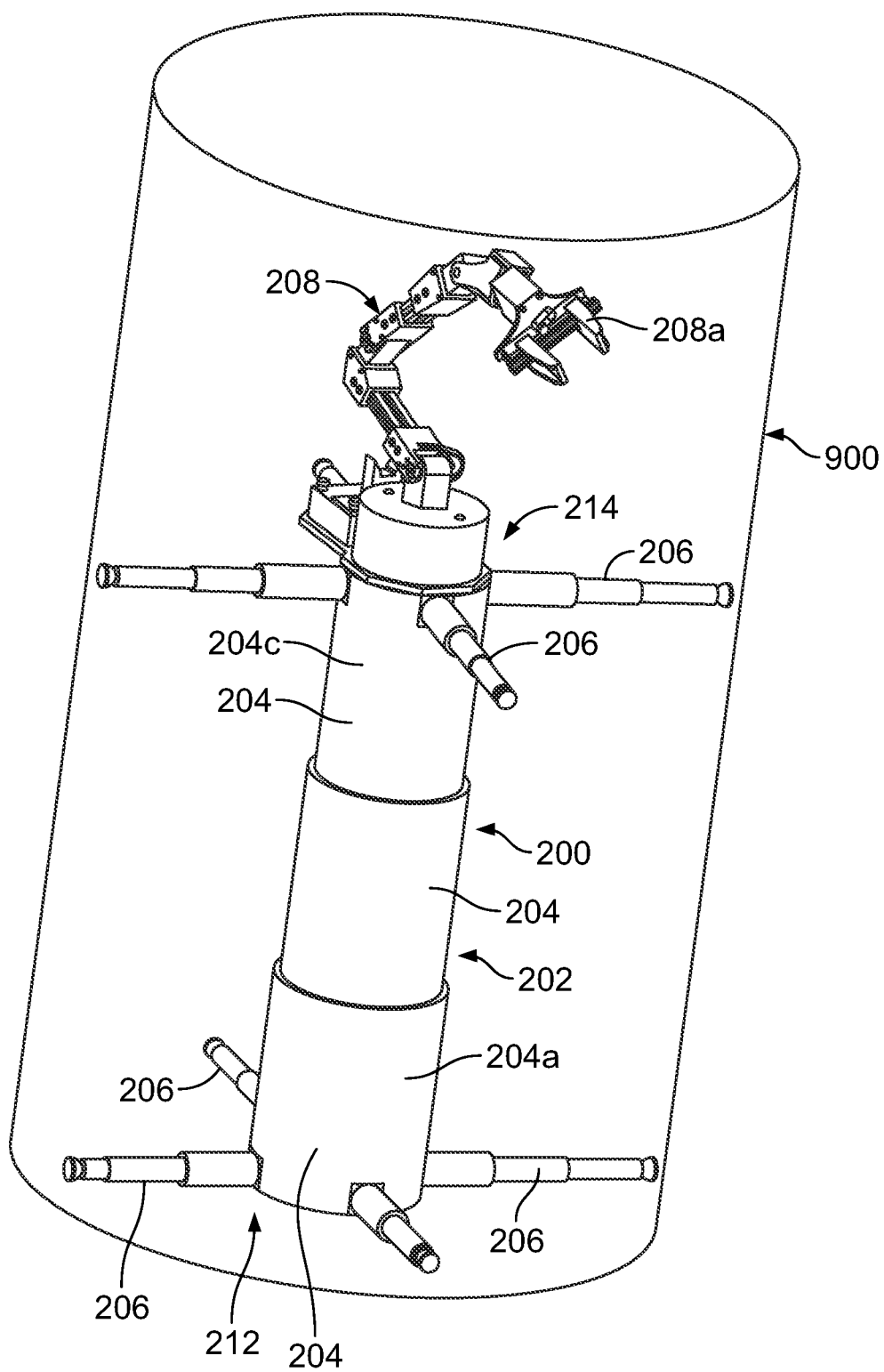
FIG. 11 is a perspective view illustrating the mobile robot shown in FIGS. 2-7 held in position within a generally vertical segment of an operating environment according to an implementation.

For example, FIG. 2 illustrates the legs 206 of both of the body segments 204a and 204b extended into physical contact with the surface of the operating environment such that the body 202 is held in position at a location within the operating environment. While the operating environment is not shown in FIGS. 2-7 for clarity, placement of the mobile robot 200 within an exemplary operating environment (i.e., an exemplary confined enclosure 900) is illustrated in FIGS. 8, 10, and 11. To move within the operating environment, the legs 206 of the body segment 204c are at least partially retracted to disengage the end portions 218 of the legs 206 of the body segment 204c from the surface of the operating environment, as is shown in FIG. 3. Once the legs 206 of the body segment 204c have been retracted from physical contact with the surface of the operating environment, the length of the body 202 is at least partially extended (e.g., expanded, lengthened, etc.) by telescoping the body segments 204 outwardly along the longitudinal axis 210 to thereby move the body end portion 214 within the operating environment in the direction 230. For example, the length of the body 202 may be extended to the extended (e.g., expanded, lengthened, etc.) position shown in FIG. 4 to maximize the amount of movement of the body end portion 214 in the direction 230.

Once the length of the body 202 has been at least partially extended, the legs 206 of the body segment 204c are extended outward into physical contact with the surface of the operating environment to thereby hold the end portion 214 of the body 202 at the new location within the operating environment, for example as is shown in FIG. 5. The legs 206 of the body segment 204a are then at least partially retracted to disengage the end portions 218 of the legs 206 of the body segment 204a from the surface of the operating environment, as is shown in FIG. 3. Once the legs 206 of the body segment 204c have been retracted from physical contact with the surface of the operating environment, the length of the body 202 is at least partially contracted (e.g., retracted, shrunk, shortened, at least partially collapsed, etc.) by telescoping the body segments 204 inwardly along the longitudinal axis 210 to thereby move the body end portion 212 within the operating environment in the direction 230. For example, the length of the body 202 may be contracted to the collapsed (i.e., retracted, contracted, etc.) position shown in FIG. 7 to maximize the amount of movement of the body end portion 212 in the direction 230. Once the length of the body 202 has been at least partially contracted, the legs 206 of the body segment 204a are extended outward into physical contact with the surface of the operating environment to thereby hold the body 202 at the new location within the operating environment, for example as is shown in FIG. 2.

Although movement of the mobile robot 200 within the operating environment has been described with respect to moving the robot 200 in the direction 230, it should be understood that the robot 200 is also configured to move in the reverse direction 232 in a substantially similar manner to that described above by first moving the body end portion 212 in the direction 232 and thereafter moving the body end portion 214 in the direction 232.

As described above, in some implementations one or more of the segments 204 of the body 202 is configured to rotate about the longitudinal axis 210. Rotation of a segment 204 about the longitudinal axis 210 enables the body 202 to reorient the legs 206 of the segment 204, for example to establish a different footing within the operating environment. For example, when the end portion 212 or 214 of the body 202 has been moved to a new location within the operating environment, the geometry and/or other characteristics of the surface of the operating environment may prevent the current orientation of the legs 206 of the corresponding segment 204a or 204c from establishing a secure foothold with the surface of the operating environment. Rotation of the corresponding segment 204a or 204c about the longitudinal axis 210 of the body 202 enables the segment 204a or 204c to change the orientation of the legs 206 thereof to attempt to establish a different foothold with the surface of the operating environment that that provides the corresponding end portion 212 or 214 of the body 202 with improved security, stability, support, holding force, grip, and/or the like.

In some implementations, the body 202 of the mobile robot 200 is configured to move along (e.g., navigate through, etc.) bends (e.g., turns, crests, troughs, peaks, valleys, etc.) of the operating environment. For example, in some implementations one or more segments 204 (e.g., the body segment 204b, etc.) of the body 202 includes a joint (not shown, e.g., the joint 344 shown in FIGS. 8 and 9, etc.) that enables the body 202 to bend along the longitudinal axis 210. In other words, the joint enables one or more segments 204 of the body 202 to tilt along the longitudinal axis 210 relative to one or more other segments 204 in at least one direction that is approximately perpendicular to the longitudinal axis 210. For example, and referring now solely to FIG. 4, in some implementations the joint enables the body segments 204a and 204c to tilt relative to each in at least one of the directions 236, 238, 240, and/or 242 (each of which extends approximately perpendicular to the longitudinal axis 210).

The joint can be configured to enable the body segments 204 to tilt relative to each other in any number of directions that are approximately perpendicular to the longitudinal axis 210. Moreover, the joint can be configured to enable any range of motion in each enabled direction of tilt, for example to enable the body 202 to move along bends (of the operating environment) of up to a predetermined angle (e.g., up to approximately 180°, etc.). For example, the joint may enable the segments 204a and 204c to tilt relative to each other along the longitudinal axis 210 in at least one direction with a range of motion of approximately 45°, approximately 90°, approximately 135°, approximately 180°, etc. It should be understood that implementations that enable rotation of one or more of the body segments 204 about the longitudinal axis 210 may reduce the number of tilt directions required to enable the body 202 to move within an operating environment having bends with different orientations.

Operation of the robot 200 to move along a bend within the operating environment leading with the body segment 204c will now be described. With the legs 206 of the body segment 204c in a retracted position and the legs 206 of the body segment 204a in an extended position that holds the body segment 204a in position at the current location within the operating environment, the body segment 204c is tilted relative to the body segment 204a as the length of the body 202 is expanded along the longitudinal axis 210. Once the body segment 204c has moved at least partially through the bend, the legs 206 of the body segment 204c are extended to hold the body segment 204c in position at the new location within or past the bend. With the legs 206 of the body segment 204a in a retracted position, the body 202 can be contracted along the length thereof to move the body segment 204a at least partially through the bend and thereby at least partially complete the turn. Depending on the length of the bend of the operating environment, the body 202 of the mobile robot 200 may move completely through the bend in a single iteration of the steps described above in this paragraph (e.g., a single "stride", etc.), or the steps described above in this paragraph are repeated until the body 202 has moved completely through the bend (i.e., has completed the turn).

Operation of the robot 200 to move along a bend within the operating environment leading with the opposite body segment 204a is substantially similar to leading with the body segment 204c described above and therefore will not be described in more detail herein.

The joint includes any structure that enables the body 202 to bend along the longitudinal axis 210, such as, but not limited to, ball joints, clevises, spherical rod ends, bearings, springs, dampers, and/or the like. Tilting of the body segments 204 relative to each other is actuated using any suitable means that enables the mobile robot 200 to move along bends within the operating environment, such as, but not limited to, passive actuation via contact with the surface of the operating environment, electrical motors, servos, solenoids, linear actuators, gears, mechanical joints, mechanical linkage, bearings, chains, pulleys, differentials, counterweights, hydraulic pumps, pneumatic pumps, mechanical systems, pneumatic systems, hydraulic systems, electrical systems, combinations thereof, and/or the like. Tilting of the body segments 204 relative to each other is powered using any suitable means that enables the mobile robot 200 to move along bends within the operating environment, such as, but not limited to, a battery system, a hard-wired electrical system, a pneumatic system, a mechanical system, a hydraulic system, combinations thereof, and/or the like. In another example, the body segments 204 tilt relative to each other passively via contact (e.g., engagement, etc.) with the surface of the operating environment (e.g., as the mobile robot 200 moves forward through the bend contact between the leading body segment 204 and the surface of the operating environment causes the leading body segment 204 to tilt relative to the other body segments 204, etc.).

Figure 9:
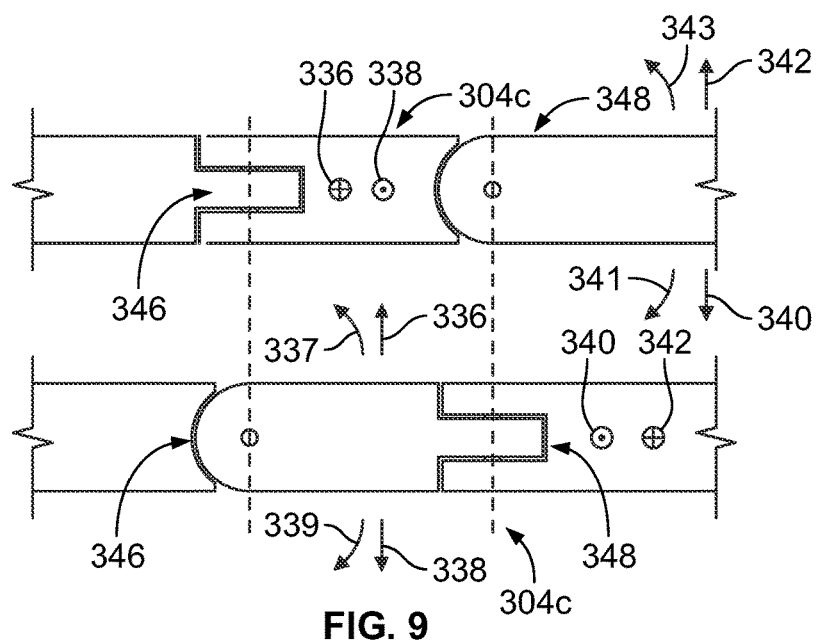
FIG. 9 illustrates an elevational view and a plan view of a joint of the mobile robot shown in FIG. 8 according to an implementation.

One example of a joint that enables the mobile robots described and/or illustrated herein to move along bends within an operating environment is illustrated in FIGS. 8 and 9.

As shown, FIG. 8 illustrates a mobile robot 300 that includes a body 302 that extends a length along a longitudinal axis 310 from an end portion 312 to an opposite end portion 314. The body 302 includes segments 304a, 304b, 304c, 304d, 304e, and 304f, at least some of which are configured to telescope inwardly and outwardly relative to each other such that the length of the body 302 can selectively expand and contract along the longitudinal axis 310. The body segment 304c includes a joint 344 that enables the body 302 to bend along the longitudinal axis 310. The longitudinal axis 310 may be referred to herein as a "longitudinal body axis". Each of the body segments 304a, 304b, 304c, 304d, 304e, and 304f may be referred to herein as a "first segment", a "second segment", a "first body segment", and/or a "second body segment".

Referring now to FIGS. 8 and 9, the joint 344 enables the body segments 304d, 304e, and 304f to tilt along the longitudinal axis 310 relative to the body segments 304a and 304b in four directions 336, 338, 340, and 342 that each extend approximately perpendicular to the longitudinal axis 310. Specifically, the joint 344 includes clevises 346 and 348. The clevis 346 enables the body segments 304d, 304e, and 304f to tilt along the longitudinal axis 310 relative to the body segments 304a and 304b in the directions 336 and 338 (e.g., with a range of motion of approximately 90°, etc.), and vice versa. In other words, the clevis 346 enables the body segments 304d, 304e, and 304f to rotate relative to the body segments 304a and 304b in the directions of the arcs 337 and 339 (not labeled in FIG. 8). The clevis 348 enables the body segments 304d, 304e, and 304f to tilt along the longitudinal axis 310 relative to the body segments 304a and 304b in the directions 340 and 342 (e.g., with a range of motion of approximately 90°, etc.), and vice versa. In other words, the clevis 348 enables the body segments 304d, 304e, and 304f to rotate relative to the body segments 304a and 304b in the directions of the arcs 341 and 343 (not labeled in FIG. 8).

Referring now to FIGS. 10 and 11, the movement of the mobile robot 200 within the operating environment described above with respect to FIGS. 2-7 enables the mobile robot 200 to operate in a plurality of different orientations (e.g., generally vertical orientations, generally horizontal orientations, orientations that are between vertical and horizontal, etc.). For example, moving the mobile robot 200 within the operating environment by selectively expanding and contracting the length of the body 202 and selectively extending and retracting the legs 206 of different body segments 204 as described above does not rely on gravity to generate stiction, friction, traction, and/or the like, and thus enables operation of the robot 200 not only in a horizontal orientation but also in a generally vertical orientation as well as orientations between vertical and horizontal (e.g., sloped paths, angled paths, hills, etc.). Accordingly, the mobile robot 200 is capable of operating on the walls and ceilings of operating environments and/or is capable of operating within operating environments that include relatively highly-sloped and/or vertical paths. FIG. 10 illustrates an example of the mobile robot 200 held in position within a generally horizontal segment of an exemplary confined enclosure 900, while FIG. 11 illustrates an example of the mobile robot 200 held in position within a generally vertical segment of the confined enclosure 900.

As briefly described above with respect to the mobile robot 100 shown in FIG. 1, in some implementations the body 202 of the mobile robot 200 is configured to hold one or more end effectors 208 for performing various tasks within the operating environment. Examples of tasks performed by the end effector 208 of the mobile robot include, but are not limited to, inspection, still image and/or video acquisition, maintenance, modification, reconfiguration, refurbishment, repair, replacement, debris removal, assembly, welding, drilling, riveting, bonding, and/or the like. In the exemplary implementation, the end effector 208 is an articulated robot arm having a grasping device 208a on an end thereof. But, the body 202 of the mobile robot 200 may additionally or alternatively hold any other type of end effector 208, such as, but not limited to, another type of robot arm, articulated robot arms holding other devices/tools in addition or alternative to the grasping device 208a, other types of grasping devices (whether held by an arm), manipulators, applicators, inspection tools, cameras, drills, lasers, rivet guns, welders, torches, lights, and/or the like. Another example of an articulated robot arm end effector 308 having a grasping device 308a is shown in FIG. 8. FIG. 8 also illustrates examples of an inspection tool end effector 408 and an applicator end effector 508.

In the exemplary implementation, the end effector 208 is held by the body segment 204c at the end portion 214 of the body 202. In other implementations, the body segment 204c may hold an end effector 208 at any other location thereon in addition or alternative to the end portion 214. Moreover, any other body segment 204 may additionally or alternatively hold an end effector 208 at any location thereon (e.g., the body segment 204a may hold an end effector 208 at the end portion 212 of the body 202, etc.). In one exemplary implementation, both of the body segments 204a and 204c hold an end effector 208. FIG. 8 illustrates an exemplary implementation wherein the body segment 304f is configured to hold the end effectors 308, 408, and 508 at the end portion 314 of the body 302. In the exemplary implementation of FIG. 8, the body segment 304a is configured to hold a battery 350, an electrical power cord 352, and/or a pneumatic line 354 at the end portion 312 of the body 302 for powering one or more operations of the mobile robot 300. Optionally, the body 302 (e.g., the body segment 304a, etc.) is configured to hold the battery 350, the electrical power cord 352, and/or the pneumatic line 354 thereon with a magnetic coupling and/or other quick-change connection to enable relatively quick and easy connection and disconnection thereof.

In some implementations, one or more end effectors 208 held by the body 202 of the mobile robot 200 is permanently affixed to the body 202 such that the body 202 includes the end effector(s) 208. Moreover, in some implementations one or more of the body segments 204 is configured to interchangeably hold different end effectors 208. For example, the body segment 204a and/or 204c is configured with a hub (e.g., at the respective end portion 212 and/or 214, etc.) that is configured to interchangeably hold different end effectors 208 in some implementations. In one exemplary implementation, a hub used to interchangeably hold different end effectors 208 is a quick-change hub (e.g., a magnetic coupling, a bayonet connection, a plug-in connection, etc.) that enables different end effectors 208 to be relatively quickly and easily interchanged (e.g., swapped out, etc.). For example, FIG. 8 illustrates an exemplary implementation of a quick-change hub 356 at the end portion 314 of the mobile robot body 302 that is configured to interchangeably hold different end effectors (e.g., the end effectors 308, 408, and 508 shown in FIG. 8, etc.).

Figure 12:
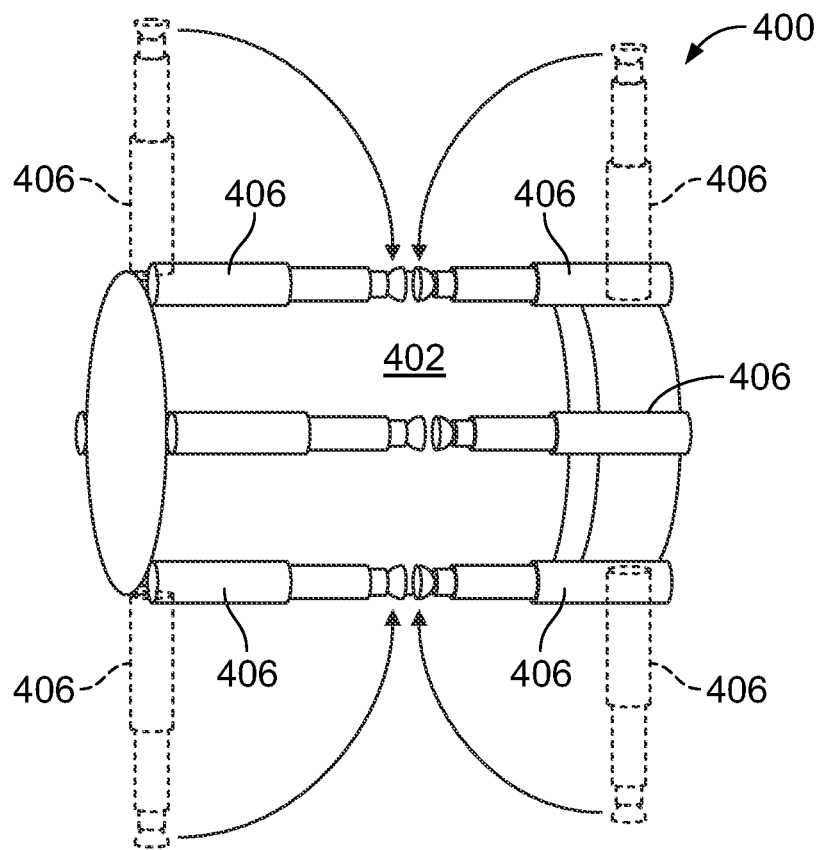
FIG. 12 is a perspective view illustrating a mobile robot according to another implementation.
Figure 13:
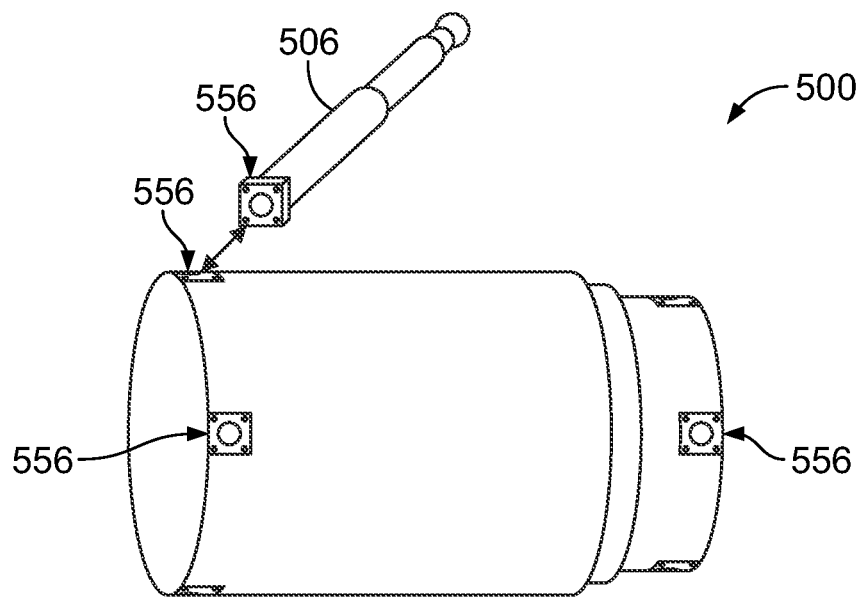
FIG. 13 is a perspective view illustrating a mobile robot according to another implementation.

At least partial retraction of one or more of the legs 206 of the mobile robot 200 facilitates accessibility, storage, transport, and/or the like of the mobile robot 200. For example, retraction of one or more of the legs 206 reduces the size, footprint, and/or the like of the mobile robot 200, thereby enabling the mobile robot 200 to be more easily accessed, stored, transported, and/or the like. In some implementations, one or more of the legs 206 is removable and/or foldable to reduce the size, footprint, and/or the like of the mobile robot 200 and thereby enable the mobile robot 200 to be more easily accessed, stored, transported, and/or the like. FIG. 12 illustrates one example of an implementation wherein the legs 406 of a mobile robot 400 are foldable toward (e.g., against, etc.) a body 402 of the mobile robot 400. FIG. 13 illustrates one example of an implementation wherein the legs 506 of a mobile robot 500 are removable, for example using a quick disconnect interface 556 (e.g., a magnetic coupling, a bayonet connection, a plug-in connection, etc.), using threaded fasteners (e.g., bolts, nuts, screws, etc.), and/or the like.

In some implementations, the mobile robot 200 is configured for use within liquid environments (e.g., sewers, natural formations, fuel tanks, lakes, rivers, oceans, etc.). For example, the mobile robot 200 is configured as waterproof, water resistant, liquid proof, liquid resistant, and/or the like in some implementations. Moreover, and for example, in some implementations the mobile robot 200 is configured for use within corrosive environments (e.g., the mobile robot 200 is configured as corrosion resistant, etc.). In yet another example, the mobile robot 200 is configured for use within explosive environments (e.g., fuel tanks, Class 1 Division 1 environments, Class 1 Division 2 environments, increased oxygen environments, flammable gas environments, etc.).

In some implementations, the mobile robot 200 is configured as modular for connection and joint operation with one or more other mobile robots. For example, in some implementations the end portion 212 and/or 214 includes a hub (not shown) that is configured to connect to another mobile robot. Accordingly, some implementations of the mobile robot are configured to be connected to one or more other mobile robots in series (e.g., a "daisy chain" arrangement, etc.) to enable the mobile robot 200 to operate in combination with one or more other mobile robots of the same or different type (e.g., another mobile robot 200, the mobile robot 100 shown in FIG. 1, a mobile robot having different operational capabilities, etc.).

Some implementations of the mobile robot 200 include a control system (not shown) that is configured to control at least some operations of the mobile robot 200. The control system may be fully autonomous, semi-autonomous, a remote control system, and/or the like. For example, a fully autonomous control system may configure the mobile robot 200 for fully autonomous operation wherein the mobile robot 200 is capable of automatically navigating to one or more locations within the operating environment and automatically performing one or more tasks using the end effector 208 without human intervention. Optionally, a fully autonomous mobile robot 200 includes a camera, a microphone, another type of sensor, and/or the like to enable a human operator and/or host computer to remotely monitor, supervise, and/or intervene the autonomous operation of the mobile robot 200.

In one example of a semi-autonomous control system, a semi-autonomous mobile robot 200 is configured to automatically navigate to one or more locations within the operating environment, whereat a human operator and/or remote host computer performs one or more tasks using the end effector 208 via remote control. Another example of semi-autonomous operation of the mobile robot 200 includes a semi-autonomous mobile robot 200 that is navigated to one or more locations within the operating environment by a human operator and/or host computer via remote control, whereat the semi-autonomous mobile robot 200 is configured to automatically perform one or more tasks using the end effector 208. A semi-autonomous mobile robot 200 optionally includes a camera, a microphone, another type of sensor, and/or the like to enable a human operator and/or host computer to remotely perform the non-autonomous (e.g., manual, etc.) operations and/or to monitor, supervise, and/or intervene the autonomous operations of the mobile robot 200 (e.g., automatic navigation, automatic task performance using the end effector 208, etc.).

As described above, some implementations of the mobile robot 200 are configured to be operated by a human operator and/or a host computer substantially or entirely via remote control. In one example, a remotely controlled mobile robot 200 is navigated to one or more locations within the operating environment by a human operator and/or host computer via remote control, whereat a human operator and/or remote host computer performs one or more tasks using the end effector 208 via remote control. A remotely controlled mobile robot 200 optionally includes a camera, a microphone, another type of sensor, and/or the like to enable a human operator and/or host computer to remotely operate the mobile robot 200.

In some implementations, the mobile robot 200 and/or a host computer includes artificial intelligence (AI) that enables a remotely controlled and/or semi-autonomous mobile robot 200 to learn one or more operations of the mobile robot 200. For example, the A1 may track non-autonomous (e.g., manual, etc.) operations that are performed by a human operator and/or the host computer over time and apply machine learning techniques to learn how to automate the non-autonomous operations. In this way, the mobile robot 200 can be programmed to autonomously perform non-autonomous operations of the mobile robot 200.

Figure 14:
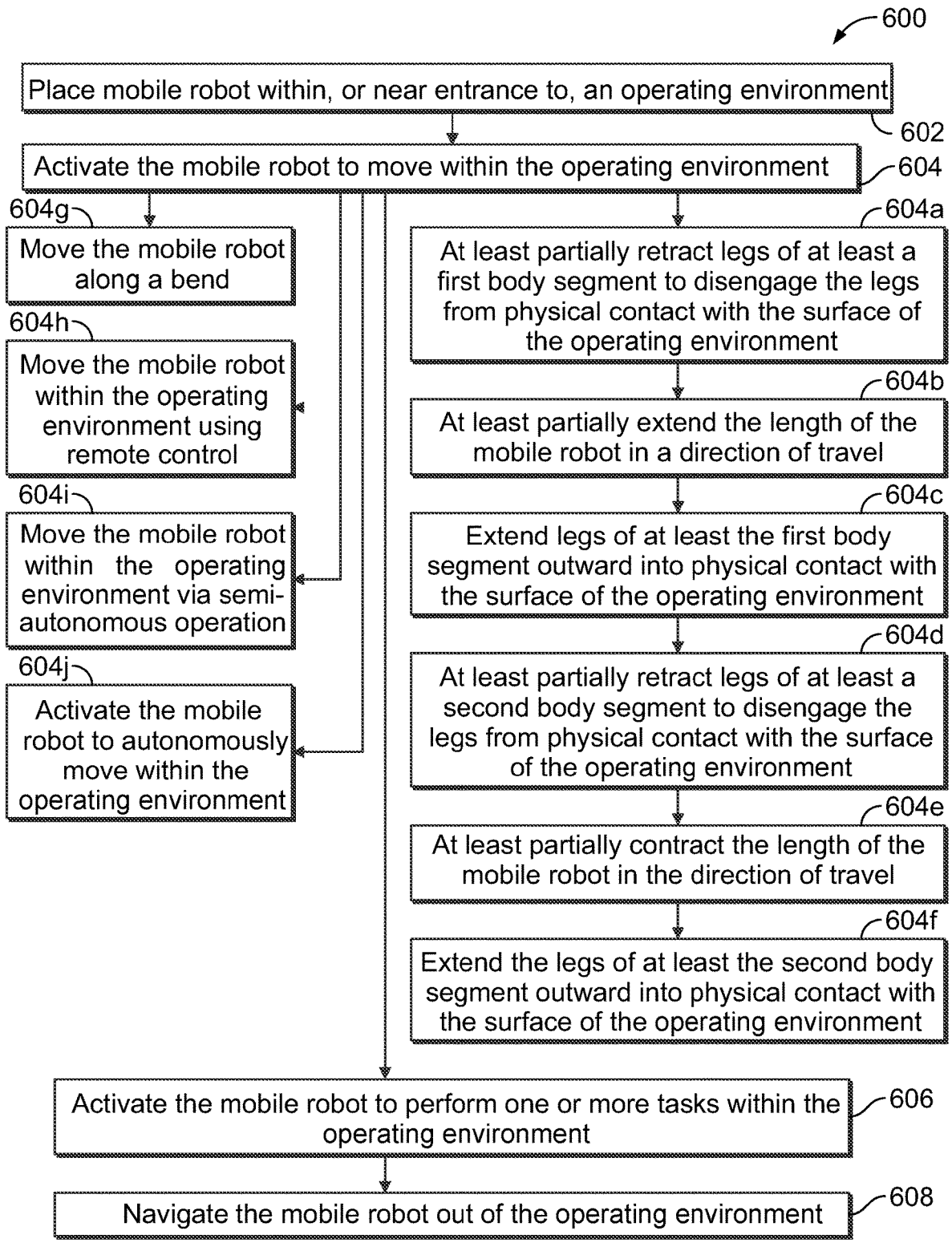
FIG. 14 is a flow chart illustrating a method for operating a mobile robot within an operating environment according to an implementation.

FIG. 14 illustrates a method 600 for operating a mobile robot (e.g., the mobile robot 100 shown in FIG. 1; the mobile robot 200 shown in FIGS. 2-7, 10, and 11; the mobile robot 300 shown in FIGS. 8 and 9; the mobile robot 400 shown in FIG. 12; the mobile robot 500 shown in FIG. 13; etc.) within an operating environment according to an implementation. The method 600 includes placing, at 602, the mobile robot within the operating environment or near an entrance to the operating environment. In some implementations, placing at 602 the mobile robot within the operating environment or near an entrance to the operating environment includes navigating the mobile robot to the entrance of the operating environment from a location remote from the entrance or a nearby starting location (e.g., using remote control, via semi-autonomous operation of the mobile robot, via activation of the mobile robot to autonomously navigate to the entrance, etc.).

At 604, the method 600 includes activating the mobile robot to move within the operating environment by selectively expanding and contracting the length of a body of the mobile robot and selectively extending and retracting different legs into and from, respectively, the surface of the operating environment. For example, in some implementations activating at 604 the mobile robot to move within the operating environment includes moving the mobile robot to one or more locations within the operating environment (e.g., one or more predetermined locations, one or more locations determined by the mobile robot while the mobile robot is within the operating environment, one or more locations determined by a human operator and/or host computer while the mobile robot is within the operating environment, etc.).

In some implementations, activating at 604 the mobile robot to move within the operating environment includes: at least partially retracting, at 604a, legs of at least a first body segment of the mobile robot to disengage the legs from physical contact with the surface of the operating environment; at least partially extending (e.g., expanding, lengthening, etc.), at 604b, the length of the body of the mobile robot in a direction of travel by telescoping at least the first body segment of the mobile robot in the direction of travel; extending, at 604c, legs of at least the first body segment outward into physical contact with the surface of the operating environment to hold the first body segment at the new location within the operating environment; at least partially retracting, at 604d, legs of at least a second body segment of the mobile robot to disengage the legs from physical contact with the surface of the operating environment; at least partially contracting (e.g., retracting, shrinking, shortening, at least partially collapsing, etc.), at 604e, the length of the body of the mobile robot in the direction of travel by telescoping at least the second body segment in the direction of travel; and extending, at 604f, legs of at least the second body segment outward into physical contact with the surface of the operating environment to hold the second body segment at the new location within the operating environment.

In some implementations, activating at 604 the mobile robot to move within the operating environment includes moving, at 604g, the mobile robot along a bend of the operating environment (e.g., using remote control, via semi-autonomous operation of the mobile robot, via fully autonomous operation of the robot, etc.).

In some implementations, activating at 604 the mobile robot to move within the operating environment includes moving, at 604h, the mobile robot within the operating environment using remote control. In other implementations, activating at 604 the mobile robot to move within the operating environment includes moving, at 604i, the mobile robot within the operating environment via semi-autonomous operation of the mobile robot. In still other implementations, activating at 604 the mobile robot to move within the operating environment includes activating, at 604j, the mobile robot to autonomously move within the operating environment.

At 606, the method 600 optionally includes activating the mobile robot to perform one or more tasks (e.g., using an end effector, etc.) within the operating environment. In some implementations, activating at 606 the mobile robot to perform one or more tasks within the operating environment includes performing the task(s) using remote control of the mobile robot. In other implementations, activating at 606 the mobile robot to perform one or more tasks within the operating environment includes performing the task(s) via semi-autonomous operation of the mobile robot. In still other implementations, activating at 606 the mobile robot to perform one or more tasks within the operating environment includes performing the task(s) via fully autonomous operation of the mobile robot.

At 608, the method 600 optionally includes navigating the mobile robot out of the operating environment (e.g., using remote control, via semi-autonomous operation of the mobile robot, via fully autonomous operation of the mobile robot, etc.).

Figure 15:
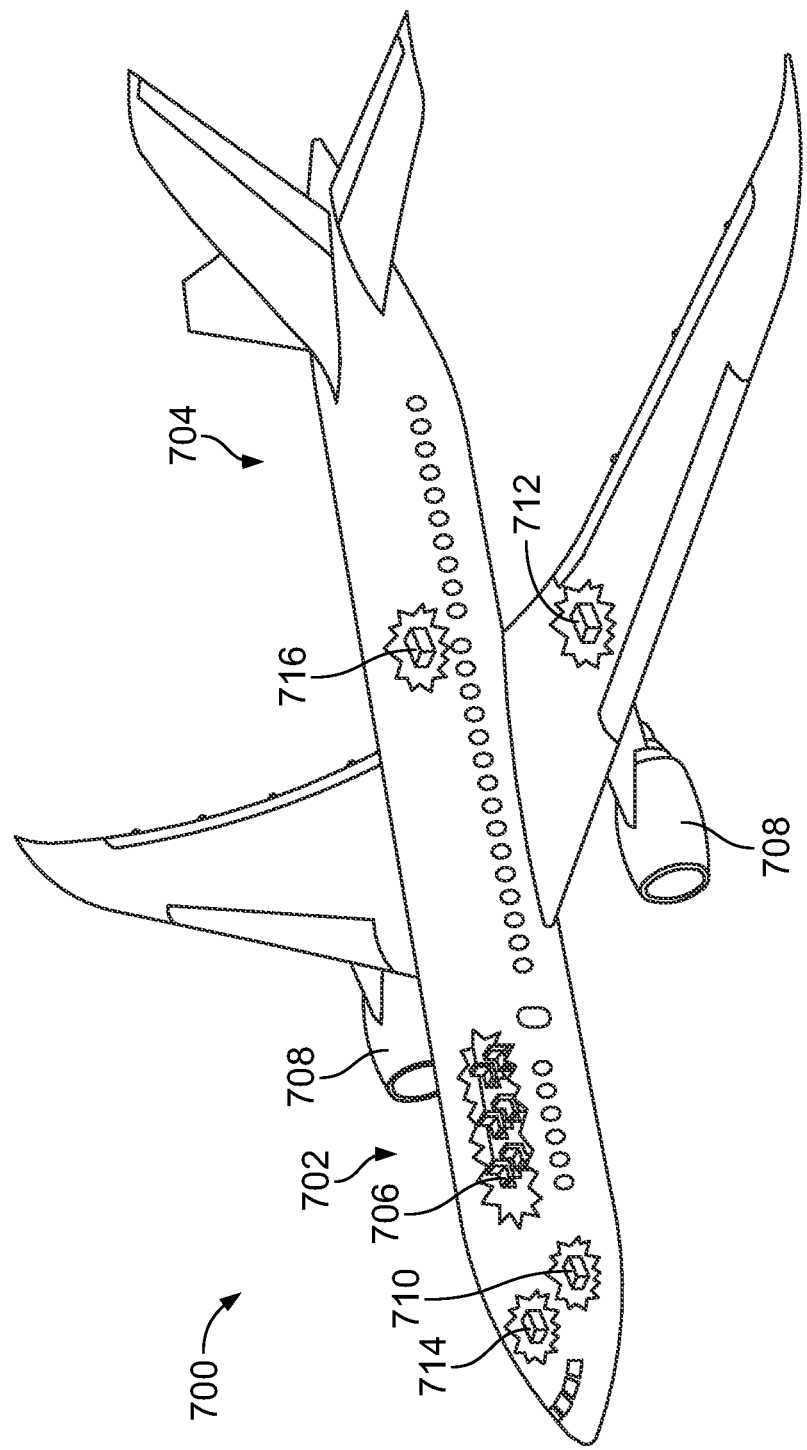
FIG. 15 is a schematic view of an implementation of an aircraft.

Referring now to FIG. 15, examples of the disclosure may be described in the context of using the mobile robots disclosed herein to build and/or service (e.g., maintenance, inspection, modification, reconfiguration, refurbishment, repair, replacement, etc.) one or more portions of an aircraft 700 that includes an airframe 702 with a plurality of high-level systems 704 and an interior 706. Examples of high-level systems 704 include one or more of a propulsion system 708, an electrical system 710, a hydraulic fluid system 712, a control system 714, and an environmental system 716. Any number of other systems can be included. Although an aerospace example is shown, the principles can be applied to other industries, such as, but not limited to, the automotive industry, the marine industry, and/or the like.

Figure 16:
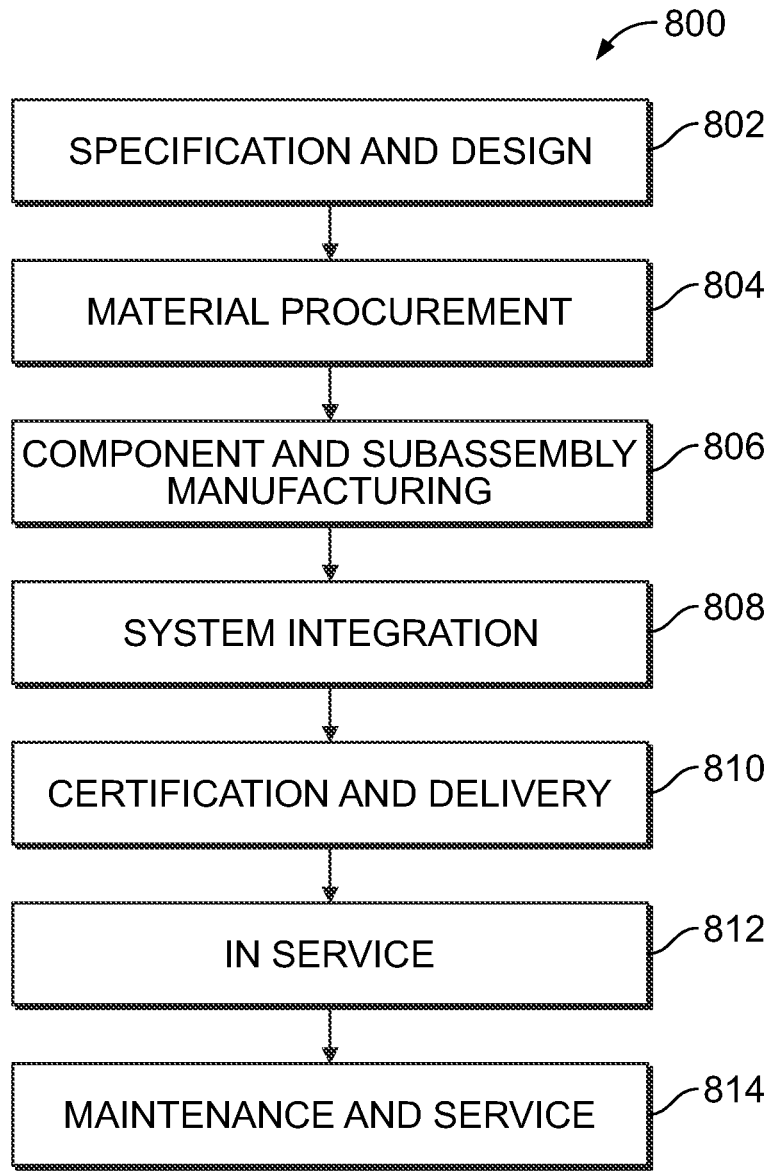
FIG. 16 is a block diagram of an implementation of an aircraft production and service methodology.

Examples of the disclosure can be described in the context of an aircraft manufacturing and service method 800 as shown in FIG. 16. During pre-production, illustrative method 800 can include specification and design 802 of an aircraft (e.g., aircraft 700 shown in FIG. 15, etc.) and material procurement 804. During production, component and subassembly manufacturing 806 and system integration 808 of the aircraft take place. Thereafter, the aircraft can go through certification and delivery 810 to be placed in service 812. While in service by a customer, the aircraft is scheduled for routine maintenance and service 814 (which can also include inspection, modification, reconfiguration, refurbishment, repair, replacement, and so on). For example, the operating environment of the mobile robots disclosed herein may include a fuel tank, a wing, a fuselage, and/or the like of an aircraft and one or more mobile robots may be used therein to service one or more components of the aircraft therein.

Each of the processes of the illustrative method 800 can be performed or carried out by a system integrator, a third party, and/or an operator (e.g., a customer, etc.). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

It should be noted that any number of other systems and/or methods can be included with the mobile robots disclosed herein. Also, although an aerospace example is shown, the principles can be applied to other industries, such as, but not limited to, the automotive industry, the marine industry, infrastructure, exploration, and/or the like.

The following clauses describe further aspects:

Clause Set A:

A1. A robot comprising:
a body comprising first and second segments configured to move relative to each other, each segment having at least two legs, the legs extending non-parallel to the body and configured to extend outwardly and retract inwardly relative to the body to enable the body to move within an operating environment.

A2. The robot of any preceding clause, wherein the body extends a length along a longitudinal axis and the first and second segments are configured to move relative to each other along the longitudinal axis such that the length of the body is configured to extend outwardly and retract inwardly along the longitudinal axis.

A3. The robot of any preceding clause, wherein the body is configured to move within the operating environment by selectively contacting the legs of the first and second segments with a surface of the operating environment and selectively extending and retracting the length of the body.

A4. The robot of any preceding clause, wherein at least one of the first segment or the second segment of the body comprises an end effector.

A5. The robot of any preceding clause, wherein at least one of the first segment or the second segment of the body is configured to rotate about a longitudinal axis of the body.

A6. The robot of any preceding clause, wherein the length of the body is configured to bend along a longitudinal axis of the body.

A7. The robot of any preceding clause, wherein the first and second segments of the body are configured to tilt relative to each other along a longitudinal axis of the body.

A8. The robot of any preceding clause, wherein the first and second segments are connected together at a joint that enables the first and second segments to tilt relative to each other in at least one direction that is approximately perpendicular to a longitudinal axis of the body.

A9. The robot of any preceding clause, wherein each leg is independently extendable and retractable relative to the body along a longitudinal axis of the leg.

A10. The robot of any preceding clause, wherein at least one of the legs comprises a foot configured to engage in physical contact with a surface of the operating environment, the foot being configured to tilt relative to a longitudinal axis of the leg.

A11. The robot of any preceding clause, wherein at least one of the legs comprises a foot mounted to the leg at a ball joint, the foot being configured to engage in physical contact with a surface of the operating environment of the robot.

A12. The robot of any preceding clause, wherein at least one of the legs comprises a foot configured to engage in physical contact with a surface of the operating environment of the robot, the foot comprising at least one of a textured surface, a pointed surface, a wheel, an adhesive surface, a suction cup, a compliant structure, or an elastomeric member.

A13. The robot of any preceding clause, wherein at least one of the legs comprises at least one of a force feedback sensor, a proximity sensor, or a pneumatic bleed system.

A14. The robot of any preceding clause, further comprising at least one of a battery system, a hard wired electrical system, a pneumatic system, a mechanical system, or a hydraulic system configured to move the first and second segments of the body relative to each other.

A15. The robot of any preceding clause, further comprising at least one of a battery system, a hard wired electrical system, a pneumatic system, a mechanical system, or a hydraulic system configured to extend and retract the legs relative to the body.

A16. The robot of any preceding clause, wherein a longitudinal axis of at least one of the legs extends approximately perpendicular to a longitudinal axis of the body.

A17. The robot of any preceding clause, wherein the operating environment of the robot comprises a confined enclosure.

Clause Set B:

B1. A robot comprising:
an end effector; and
a body holding the end effector, the body extending a length along a longitudinal body axis, the body comprising first and second segments configured to move relative to each other along the longitudinal body axis such that the length of the body is configured to extend outwardly and retract inwardly along the longitudinal body axis, each segment of the body comprising at least two legs, the legs extending lengths along corresponding longitudinal leg axes that extend non-parallel to the longitudinal body axis, wherein the legs are configured to extend outwardly and retract inwardly relative to the body along the longitudinal leg axes.

Clause Set C:

C1. A robot comprising:
a telescoping body extending a length along a longitudinal axis, the body comprising first and second segments configured to telescope inwardly and outwardly relative to each other along the longitudinal axis such that the length of the body is configured to expand and contract along the longitudinal axis; and
the first segment of the body comprising at least two telescoping legs, the second segment of the body comprising at least two telescoping legs, wherein the telescoping legs are configured to telescope along lengths thereof such that the telescoping legs are configured to be extended outward relative to the body into physical contact with a surface of an operating environment of the robot.

C2. The robot of clause C1, wherein the body is configured to move within the operating environment by selectively contacting the legs of the first and second segments with the surface of the operating environment and selectively expanding and contracting the length of the body along the longitudinal axis.

Clause Set D:

D1. A method of operating the robot of claim 1, the method comprising:
activating the robot to move within an operating environment by selectively expanding and contracting the length of the body of the robot and selectively extending and retracting different legs into and from, respectively, a surface of the operating environment.

D2. The method of any preceding clause, further comprising activating the robot to perform one or more tasks within the operating environment.

D3. The method of any preceding clause, further comprising navigating the mobile robot to an entrance of the operating environment from a location remote from the entrance.

D4. The method of any preceding clause, wherein activating the robot to move within the operating environment by selectively expanding and contracting the length of the body of the robot and selectively extending and retracting different legs into and from, respectively, the surface of the operating environment comprises:
at least partially retracting at least some of the legs of at least the first segment of the body to disengage the legs from physical contact with the surface of the operating environment;
at least partially extending the length of the body of the robot in a direction of travel by telescoping at least the first segment of the body in the direction of travel;
extending at least some of the legs of at least the first segment of the body outward into physical contact with the surface of the operating environment;
at least partially retracting at least some of the legs of at least a second segment of the body to disengage the legs from physical contact with the surface of the operating environment;
at least partially contracting the length of the body of the robot in the direction of travel by telescoping at least the second segment of the body in the direction of travel; and
extending at least some of the legs of at least the second segment of the body outward into physical contact with the surface of the operating environment.

D5. The method of any preceding clause, wherein activating the robot to move within the operating environment comprises moving the robot along a bend of the operating environment.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps, etc.) is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A robot comprising:
a body comprising a first body segment, a second body segment, and a third body segment connected along a longitudinal axis, the third body segment having an outer dimension transverse to the longitudinal axis smaller than an inner dimension of second body segment such that the third body segment is slidable into the second body segment along the longitudinal axis, the second body segment having an outer dimension transverse to the longitudinal axis smaller than an inner dimension of the first body segment such that the second body segment is slidable into the first body segment along the longitudinal axis; the first body segment and third body segment each having at least two legs extending non-parallel to the longitudinal axis and configured to extend outwardly and retract inwardly relative to the body to enable the body to move within an operating environment; and
an end effector connected to an end of the body.

2. The robot of claim 1, wherein the first body segment, the second body segment and the third body segment are configured to move relative to each other along the longitudinal axis such that the length of the body is configured to extend outwardly and retract inwardly along the longitudinal axis.

3. The robot of claim 1, wherein the body is configured to move within the operating environment by selectively contacting the legs of the first and third body segments with a surface of the operating environment and selectively extending and retracting a length of the body.

4. The robot of claim 1, wherein at least one of the first body segment or the third body segment of the body is configured to rotate about a longitudinal axis of the body.

5. The robot of claim 1, wherein a length of the body is configured to bend along a longitudinal axis of the body.

6. The robot of claim 1, wherein each leg is independently extendable and retractable relative to the body along a longitudinal axis of the leg.

7. The robot of claim 1, wherein at least one of the legs comprises a foot configured to engage in physical contact with a surface of the operating environment, the foot being configured to tilt relative to a longitudinal axis of the leg.

8. The robot of claim 1, wherein at least one of the legs comprises a foot mounted to the leg at a ball joint, the foot being configured to engage in physical contact with a surface of the operating environment of the robot.

9. The robot of claim 1, wherein at least one of the legs comprises a foot configured to engage in physical contact with a surface of the operating environment of the robot, the foot comprising at least one of a textured surface, a pointed surface, a wheel, an adhesive surface, a suction cup, a compliant structure, or an elastomeric member.

10. The robot of claim 1, wherein at least one of the legs comprises at least one of a force feedback sensor, or a proximity sensor.

11. The robot of claim 1, further comprising at least one of a battery system, a hard wired electrical system, a pneumatic system, a mechanical system, or a hydraulic system configured to move the first, second and third body segments relative to each other.

12. The robot of claim 1, further comprising at least one of a battery system, a hard wired electrical system, a pneumatic system, a mechanical system, or a hydraulic system configured to extend and retract the legs relative to the body.

13. The robot of claim 1, wherein a longitudinal axis of at least one of the legs extends approximately perpendicular to a longitudinal axis of the body.

14. A method of operating a robot of claim 1, the method comprising:
 activating the robot to move within an operating environment by selectively expanding and contracting a length of the body of the robot and selectively extending and retracting different legs into and from, respectively, a surface of the operating environment.

15. The method of claim 14, further comprising activating the robot to perform one or more tasks within the operating environment.

16. The method of claim 14, further comprising navigating the mobile robot to an entrance of the operating environment from a location remote from the entrance.

17. The method of claim 14, wherein activating the robot to move within the operating environment by selectively expanding and contracting the length of the body of the robot and selectively extending and retracting different legs into and from, respectively, the surface of the operating environment comprises:
 at least partially retracting at least some of the legs of at least the first body segment to disengage the legs from physical contact with the surface of the operating environment;
 at least partially extending the length of the body of the robot in a direction of travel by telescoping at least the first body segment in the direction of travel;
 extending at least some of the legs of at least the first body segment outward into physical contact with the surface of the operating environment;
 at least partially retracting at least some of the legs of at least the third body segment to disengage the legs from physical contact with the surface of the operating environment;
 at least partially contracting the length of the body of the robot in the direction of travel by telescoping at least the third body segment in the direction of travel; and
 extending at least some of the legs of at least the third body segment outward into physical contact with the surface of the operating environment.

18. The method of claim 14, wherein activating the robot to move within the operating environment comprises moving the robot along a bend of the operating environment.

19. A robot comprising:
 a body comprising a first body segment, a second body segment, and a third segment configured along a longitudinal axis, the second body segment having an outer dimension transverse to the longitudinal axis smaller than an inner dimension of the first body segment such that the second body segment is slidable into the first body segment along the longitudinal axis, to the first body segment and third body segment each comprising at least two legs, the legs extending lengths along corresponding longitudinal leg axes that extend non-parallel to the longitudinal body axis, wherein the legs are configured to extend outwardly and retract inwardly relative to the body along the longitudinal leg axes, the third body segment connected to the second body segment at a joint configured to enable the third body segment to tilt along the longitudinal axis relative to the second body segment; and
 an end effector connected to an end of the body.

20. The robot of claim 19, wherein the second and third body segments are configured to tilt relative to each other in four directions, each direction perpendicular to the longitudinal axis of the body.

21. The robot of claim 19, wherein the joint is configured to rotate the third body segment relative to the second body segment about the longitudinal axis.

22. The robot of claim 19, wherein each leg is independently extendable and retractable relative to the body along a longitudinal axis of the leg.

23. A robot comprising:
 a telescoping body extending a length along a longitudinal axis, the body comprising a first body segment having a first diameter, a second body segment having a second diameter smaller than the first diameter, and a third body segment having a third diameter smaller than the second diameter such that the second body segment is configured to telescope inwardly and outwardly relative to and within the first body segment, and the third body segment is configured to telescope inwardly and outwardly relative to and within the second body segment along the longitudinal axis such that the length of the body is configured to expand and contract along the longitudinal axis; and
 the first body segment comprising at least two telescoping legs in a plane perpendicular to the longitudinal axis, the third body segment comprising at least two telescoping legs in a plane perpendicular to the longitudinal axis, wherein the telescoping legs are configured to telescope along lengths thereof such that the telescoping legs are configured to be extended outward relative to the body into physical contact with a surface of an operating environment of the robot.

24. The robot of claim 23, wherein the body is configured to move within the operating environment by selectively contacting the legs of the first and third body segments with the surface of the operating environment and selectively expanding and contracting the length of the body along the longitudinal axis.

* * * * *